United States Patent
Inushima et al.

(10) Patent No.: US 8,529,045 B2
(45) Date of Patent: Sep. 10, 2013

(54) INK SET AND IMAGE FORMING METHOD

(75) Inventors: Reiko Inushima, Kanagawa (JP); Ryuki Kakino, Kanagawa (JP); Naoya Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 324 days.

(21) Appl. No.: 12/874,241

(22) Filed: Sep. 2, 2010

(65) Prior Publication Data

US 2011/0057987 A1 Mar. 10, 2011

(30) Foreign Application Priority Data

Sep. 10, 2009 (JP) ................ 2009-209358

(51) Int. Cl.
*B41J 2/01* (2006.01)
(52) U.S. Cl.
USPC ............................. 347/100; 347/95; 347/96
(58) Field of Classification Search
USPC ............... 347/100, 95, 96, 101, 102, 21, 20, 347/9; 106/31.6, 31.13, 31.27; 523/160, 523/161
See application file for complete search history.

(56) References Cited

U.S. PATENT DOCUMENTS

| | | | |
|---|---|---|---|
| 6,439,708 B1 | 8/2002 | Kato et al. | |
| 7,300,145 B2 * | 11/2007 | Doi | 347/100 |
| 2007/0216743 A1 * | 9/2007 | Makuta et al. | 347/100 |
| 2008/0055385 A1 | 3/2008 | Houjou | |
| 2009/0088521 A1 * | 4/2009 | Hosokawa et al. | 524/558 |
| 2009/0202723 A1 | 8/2009 | Ikoshi et al. | |
| 2009/0202724 A1 * | 8/2009 | Arai et al. | 106/31.86 |
| 2009/0203833 A1 * | 8/2009 | Sasada et al. | 524/558 |
| 2009/0208652 A1 | 8/2009 | Sasada et al. | |
| 2011/0074867 A1 | 3/2011 | Nishimura et al. | |

FOREIGN PATENT DOCUMENTS

| | | |
|---|---|---|
| EP | 1555274 A1 | 7/2005 |
| EP | 2090626 | 8/2009 |
| EP | 2096150 | 9/2009 |
| EP | 2221351 | 8/2010 |
| JP | 2005-133089 A | 5/2005 |
| JP | 2006-176623 | 7/2006 |
| JP | 2006-342201 A | 12/2006 |
| JP | 4109713 B2 | 7/2008 |
| JP | 2009-084494 | 4/2009 |
| WO | 2006-074483 | 7/2006 |
| WO | 2007/130561 A2 | 11/2007 |
| WO | 2009-001967 | 12/2008 |
| WO | 2009-085166 | 7/2009 |

* cited by examiner

*Primary Examiner* — Manish S Shah
(74) *Attorney, Agent, or Firm* — SOLARIS Intellectual Property Group, PLLC

(57) ABSTRACT

An ink set including an aqueous ink composition and a treatment liquid is disclosed. The aqueous ink composition includes a pigment, a graft polymer including an anionic group at a side chain thereof, and an aqueous medium. The treatment liquid includes an acidic compound that aggregates one or more components of the aqueous ink composition.

12 Claims, No Drawings

INK SET AND IMAGE FORMING METHOD

CROSS-REFERENCE TO RELATED APPLICATION

This Application claims priority under 35 USC 119 from Japanese Patent Application No. 2009-209358 filed on Sep. 10, 2009, the disclosure of which is incorporated by reference herein.

BACKGROUND OF THE INVENTION

1. Technical Field

The present invention relates to an ink set and an image forming method.

2. Description of the Related Art

In recent years, as a result of ever-increasing demand for the protection of resources, protection of the environment, the enhancement of operational stability, and the like, the conversion of paints and inks into aqueous products is advancing. As in the case of oil-based paints and oil-based inks, the qualities required in aqueous paints and aqueous inks include fluidity, storage stability, glossiness of film, clarity, coloring ability, and the like. Pigments essentially have high durability and extremely excellent lightfastness and water resistance as compared with dyes due to their high crystallinity. However, compared with oil-based vehicles, most pigments have a markedly poor adaptability to aqueous vehicles with respect to pigment dispersibility and the like and therefore, satisfactory quality cannot be obtained by conventional dispersion methods. The use of various additives, for example, aqueous pigment dispersion resins or surfactants, has hitherto been studied, but an aqueous paint or an aqueous ink that satisfies all the adaptation properties described above and is comparable to existing high quality oil-based paints or high quality oil-based inks has not been obtained.

Further, concerning an ink jet ink, an ink jet ink having high penetrability into a recording medium is generally used, in consideration of its fixing rate and bleeding between colors. Therefore, when an image is formed using a plain paper, the colorant may penetrate toward the inside of the recording medium, and a sufficient amount of colorant to be fixed on the surface of the recording medium can not be secured and, as a result of which, a recorded matter having a good colorability is difficult to obtain.

In connection with the above, in order to improve dispersibility of the pigment, a pigment-dispersed ink prepared by using a graft polymer in which the main chain and the side chain have different functions such that the functions of the main chain and the side chain are separated into a hydrophilic function and a hydrophobic function has been disclosed (see, for example, Japanese Patent Application Laid-Open (JP-A) No. 2005-133089). Further, in order to improve storage stability of the ink, an ink jet ink prepared by using a polymer dispersant which has a small dispersion with respect to hydrophobic group units and hydrophilic group units has been disclosed (see, for example, JP-A No. 2006-342201).

SUMMARY OF THE INVENTION

According to an aspect of the present invention, an ink set including an aqueous ink composition including a pigment, a graft polymer including an anionic group at a side chain thereof, and an aqueous medium; and a treatment liquid including an acidic compound that aggregates one or more components of the aqueous ink composition, is provided.

According to another aspect of the present invention, an image forming method using the ink set of claim of the present invention is provided. The method includes supplying the treatment liquid of the ink set onto a recording medium; and supplying the aqueous ink composition of the ink set onto the recording medium, wherein the aqueous ink composition and the treatment liquid are brought into contact with each other to form an image.

DETAILED DESCRIPTION OF THE INVENTION

Inks prepared by using a dispersant described in JP-A No. 2005-133089 or JP-A No. 2006-342201 are not sufficient in view of image bleeding and rub resistance.

<Ink Set>

The ink set of the present invention includes at least one aqueous ink composition containing a pigment, a graft polymer including an anionic group at a side chain thereof, and an aqueous medium; and at least one treatment liquid containing an acidic compound that aggregates components of the aqueous ink composition.

By forming an image using an ink composition and a treatment liquid each having such a configuration as described above, respectively, an image in which occurrence of bleeding is suppressed and which has excellent rub resistance can be obtained. Further, the aqueous ink composition contains a pigment and a graft polymer including an anionic group at a side chain thereof and, therefore, excellent stability of the ink over time, and also excellent ejection stability and ejection recoverability of the ink in an ink-jet method may be attained.

[Aqueous Ink Composition]

The aqueous ink composition of the present invention contains at least one pigment, at least one graft polymer including an anionic group at a side chain thereof, and an aqueous medium. The graft polymer used in the aqueous ink composition of the present invention is used as, for example, a dispersant for dispersing the pigment in the aqueous medium.

When the graft polymer that is used as a dispersant includes a hydrophilic anionic group at a side chain thereof (hereinafter, may be referred to as a "branch polymer"), a hydrophobic partial structure (preferably, a partial structure including an aromatic ring) which may be incorporated in the main chain (hereinafter, may be referred to as a "stem polymer") more efficiently adsorbs to the pigment surfaces. Further, when at least a part of the anionic groups included in the side chain is neutralized, the polymer is liable to be in a state in which the side chain further expands in the aqueous medium due to the synergetic action of electrostatic repulsion between the anionic groups and the steric repulsion of the side chain itself, whereby dispersibility and stability over time of the pigment are improved.

For example, when a pigment that is dispersed using a graft polymer (a dispersant) having such a configuration is brought into contact with an acidic compound, the anionic groups included in the side chain are neutralized by the acidic compound, and thus the electrostatic repulsion is decreased, and further, accompanying this, the spatial expansion of the side chain itself becomes small. Owing to this, the electrostatic repulsion and steric repulsion between the pigment particles which are dispersed in the aqueous medium rapidly decrease, and the pigment dispersion aggregates at a high aggregation rate. As a result, an image in which image bleeding is suppressed and which has excellent rub resistance can be formed.

(Pigment)

The pigment used in the invention is not particularly limited and may be appropriately selected according to the purposes. For example, any of an organic pigment and an inorganic pigment may be used.

Examples of the organic pigment include an azo pigment, a polycyclic pigment, dye chelate, a nitro pigment, a nitroso pigment, and aniline black. Among them, an azo pigment, a polycyclic pigment, and the like are preferable. Examples of the azo pigment include azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye chelate and an acidic dye chelate.

Examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. The carbon black may be produced by a known method, for example, a contact method, a furnace method, a thermal method, or the like.

Specific examples of the pigment which can be used in the invention include the pigments described in paragraphs [0142] to [0145] of JP-A No. 2007-100071.

The above pigments may be used alone or in a combination of two or more of them.

The content of the pigment in the ink composition is preferably from 0.1% by mass to 20% by mass, more preferably from 0.2% by mass to 15% by mass, and particularly preferably from 0.5% by mass to 10% by mass, with respect to the total mass of solid matters in the ink composition, from the viewpoints of ink coloring property and storage stability.

The pigments may be used alone or plural pigments may be used in combination.

(Graft Polymer)

The graft polymer in the present invention (hereinafter, referred to as "dispersant" in some cases) includes at least one type of anionic groups at a side chain thereof. The graft polymer in the present invention preferably includes a repeating unit containing a side chain including an anionic group and, as needs arise, a repeating unit represented by Formula (1) described below and other repeating unit.

The anionic group is not particularly limited as far as it is a functional group that can dissociate to produce an anion in an aqueous medium. Examples of the anionic group include at least one selected from the group consisting of a carboxy group, a sulfonic acid group, a phosphoric acid group. It is preferred that the anionic group is a carboxy group from the viewpoints of dispersion stability and aggregation property.

The side chain (branch polymer) including an anionic group may be a side chain that includes a hydrophilic repeating unit derived from a monomer including an anionic group, or may be formed by introducing an anionic group after forming a side chain (blanch chain). In the present invention, from the viewpoints of production efficiency and stability, it is preferred that the side chain includes a hydrophilic repeating unit derived from a monomer including an anionic group.

As the monomer having an anionic group, a generally used monomer can be used without any particular limitation.

Concerning the monomer having an anionic group, specifically, examples of a monomer including a carboxy group include acrylic acid, methacrylic acid, crotonic acid, itaconic acid, maleic acid, fumaric acid, citraconic acid, and 2-methacryloyloxy ethyl succinate.

Examples of a monomer including a sulfonic acid group include styrenesulfonic acid, 2-acrylamido-2-methylpropanesulfonic acid, 3-sulfopropyl(meth)acrylate, and bis(3-sulfopropyl)itaconate.

Examples of a monomer including a phosphoric acid group include vinylphosphonic acid, vinylphosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

Among the above monomers, the monomer including an anionic group in the invention is preferably a monomer including a carboxy group, and more preferably at least one of methacrylic acid or acrylic acid, from the viewpoint of dispersibility and stability of the pigment when an aqueous pigment dispersion is obtained.

The above monomers including an anionic group may be used alone or as a mixture of two or more of them.

Further, the side chain including an anionic group may include at least one kind of a nonionic hydrophilic group or a cationic group in addition to the anionic group.

Examples of the nonionic hydrophilic group include a hydroxy group, an amido group (in which the nitrogen atom is not substituted), and an alkylene oxide polymer such as polyethylene oxide or polypropylene oxide.

The nonionic hydrophilic group is preferably contained in the side chain as a hydrophilic repeating unit including a nonionic hydrophilic group. The monomer that may be used for forming the hydrophilic repeating unit including a nonionic hydrophilic group is not particularly limited, but vinyl monomers are preferable from the viewpoints of availability, handling property, and versatility.

Examples of a monomer including a nonionic hydrophilic group include (meth)acrylates having a hydrophilic functional group, (meth)acrylamides, and vinyl esters. Among them, hydroxyethyl(meth)acrylate, hydroxybutyl(meth)acrylate, (meth)acrylamide, and (meth)acrylate containing an alkylene oxide polymer are particularly preferable.

The alkylene group in the alkylene oxide polymer preferably has from 1 to 6 carbon atoms, more preferably from 2 to 6 carbon atoms, and particularly preferably from 2 to 4 carbon atoms, from the viewpoints of hydrophilicity and hydrophobicity. Further, the polymerization degree of the alkylene oxide polymer is preferably from 1 to 120, more preferably from 1 to 60, and particularly preferably from 1 to 30.

Examples of the cationic groups include an amino group and an ammonium group. It is preferable that the cationic group is contained in the side chain as a hydrophilic repeating unit having a cationic group. The monomer that may be used for forming the hydrophilic repeating unit including a cationic group is not particularly limited, but vinyl monomers are preferable from the viewpoints of availability, handling property, and versatility.

Examples of a monomer including a cationic group include tertiary amine-containing vinyl monomers such as N,N-dimethylaminoethyl(meth)acrylate, N,N-dimethylaminopropyl(meth)acrylate, N,N-diethylaminoethyl(meth)acrylate, N,N-dimethylaminopropyl(meth)acrylamide, vinylpyrrolidone, 2-vinylpyridine, 4-vinylpyridine, 2-methyl-6-vinylpyridine, and 5-ethyl-2-vinylpyridine.

Further, specific examples of ammonium salt-containing vinyl monomers include quaternized N,N-dimethylaminoethyl(meth)acrylate, quaternized N,N-diethylaminoethyl(meth)acrylate, and quaternized N,N-dimethylaminopropyl(meth)acrylate.

"(Meth)acrylate" means acrylate or methacrylate, and "(meth)acrylamide" means acrylamide or methacrylamide.

The side chain including an anionic group in the present invention may further include at least one type of hydrophobic repeating units. The monomer that may be used for forming the hydrophobic repeating unit is not particularly limited as far as the monomer includes a functional group that can be used to form the side chain, and a hydrophobic functional group, and a known monomer can be used without any particular limitation.

As the monomer that may be used for forming the hydrophobic repeating unit, vinyl monomers (for example, (meth) acrylates, (meth)acrylamides, styrenes, and vinyl esters) are preferable from the viewpoints of availability, handling property, and versatility.

Concerning the vinyl monomers preferably used as the monomer that may be used for forming the hydrophobic repeating unit, specific examples of (meth)acrylates include alkyl(meth)acrylates such as methyl(meth)acrylate, ethyl (meth)acrylate, (iso)propyl(meth)acrylate, (iso, or t-)butyl (meth)acrylate, 2-ethylhexyl(meth)acrylate, (iso)octyl(meth) acrylate, (iso)decyl(meth)acrylate, and (iso)stearyl(meth) acrylate. Among them, alkyl(meth)acrylates having from 1 to 6 carbon atoms are preferable, and alkyl(meth)acrylates having from 1 to 4 carbon atoms are more preferable.

Specific examples of (meth)acrylamides include (meth) acrylamide, N-methyl(meth)acrylamide, N-ethyl(meth)acrylamide, N-propyl(meth)acrylamide, N-isopropyl(meth)acrylamide, N-n-butyl(meth)acrylamide, N-t-butyl(meth) acrylamide, N-cyclohexyl(meth)acrylamide, N-(2-methoxyethyl)(meth)acrylamide, N,N-dimethyl(meth) acrylamide, N,N-diethyl(meth)acrylamide, vinyl(meth) acrylamide, N,N-diallyl(meth)acrylamide, and N-allyl (meth)acrylamide. Among them, (meth)acrylamide and N,N-dimethyl(meth)acrylamide are preferable.

Specific examples of styrenes include styrene, methylstyrene, dimethylstyrene, trimethylstyrene, ethylstyrene, isopropylstyrene, n-butylstyrene, t-butylstyrene, methoxystyrene, butoxystyrene, acetoxystyrene, chlorostyrene, dichlorostyrene, bromostyrene, chloromethylstyrene, hydroxystyrene protected with a group (for example, t-Boc (t-butoxycarbonyl) or the like) capable of being eliminated with an acidic substance, methyl vinylbenzoate, α-methylstyrene, and vinylnaphthalene. Among them, styrene and α-methylstyrene are preferable.

Specific examples of vinyl esters include vinyl acetate, vinyl chloroacetate, vinyl propionate, vinyl butyrate, vinyl methoxyacetate, and vinyl benzoate. Among them, vinyl acetate is preferable.

These monomers may be used alone, or as a mixture of two or more of them.

The content of the repeating unit including an anionic group is preferably from 1% by mass to 40% by mass, more preferably from 1% by mass to 35% by mass, and particularly preferably from 1% by mass to 30% by mass, with respect to the total mass of the dispersant. When the content of the repeating unit including an anionic group is 1% by mass or more, charge repulsive property in the water dispersion liquid may be enhanced, so that the pigment may be finely dispersed and dispersion stability may be enhanced. When the content is 40% by mass or less, the solubility in water of the dispersant may be suppressed from being too high, adsorptivity of the dispersant to the pigment may be enhanced, and dispersion stability may be enhanced.

Further, the dispersant preferably has an acid value of 5 mgKOH/g or more but less than 500 mgKOH/g, more preferably 10 mgKOH/g or more but less than 450 mgKOH/g, and particularly preferably 15 mgKOH/g or more but less than 400 mgKOH/g. Note that, the acid value used herein is defined as the mass (mg) of KOH necessary for completely neutralizing 1 g of the dispersant, and is a value measured in accordance with the method described in Japanese Industrial Standards (JIS K 0070:1992), the disclosure of which is incorporated by reference herein.

When the acid value of the dispersant including an anionic group at a side chain thereof is 5 mgKOH/g or more, the charge repulsive property of the dispersion caused by dissociated carboxy groups may be sufficiently obtained, and as a result of which, the dispersibility tends to be enhanced. When the acid value is less than 500 mgKOH/g, the hydrophilicity of the polymer may be suppressed from being too high, and the adsorptivity of the dispersant to the pigment tends to be enhanced.

Specific examples of the repeating unit containing a side chain including an anionic group, which is included in the dispersant, are shown below, but the present invention is not limited to the following specific examples.

Note that, in the following specific examples, each repeating unit in a bracket means a repeating unit which is included in the side chain, and the subscript at each repeating unit represents the content (%) of the repeating unit, which is included in the side chain, on the basis of mass.

Further, in each specific example, an example of the weight average molecular weight (Mw) of the repeating unit is shown.

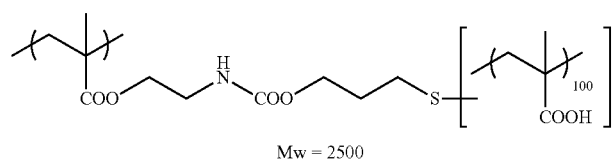

B-1

Mw = 2500

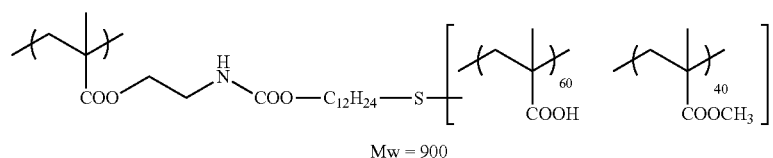

B-2

Mw = 900

-continued
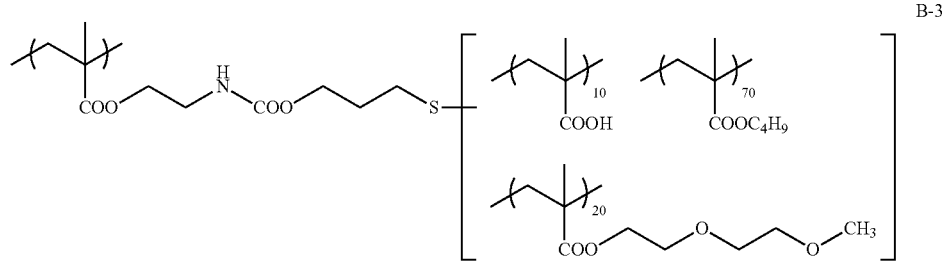
B-3
Mw =6700
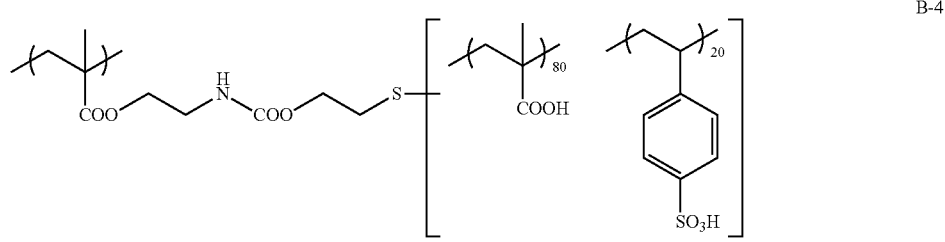
B-4
Mw = 19500
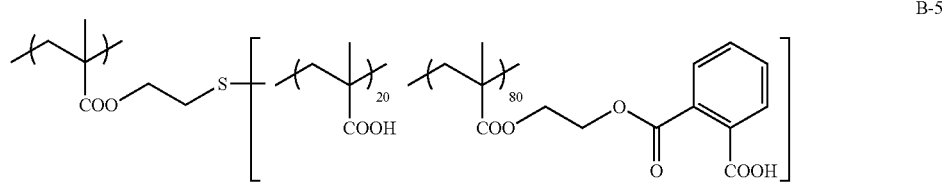
B-5
Mw = 13300
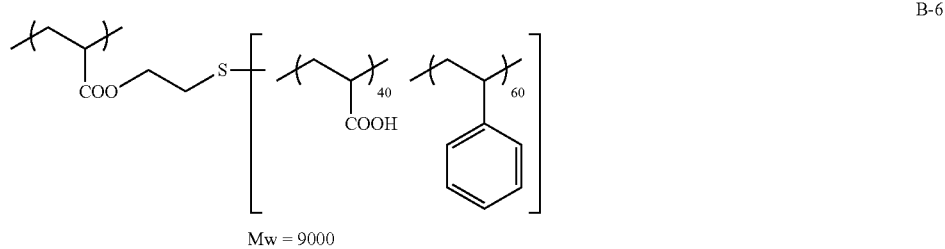
B-6
Mw = 9000
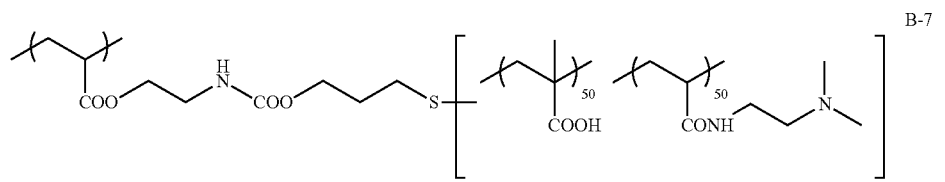
B-7
Mw = 3100
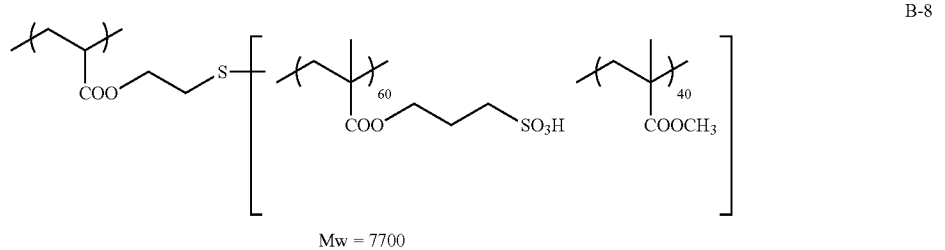
B-8
Mw = 7700

One kind of the side chains having the anionic group in the invention may be contained in the graft polymer, or two or more kinds thereof may be contained in the graft polymer in combination.

The molecular weight of the side chain portion including an anionic group is preferably from 800 to 20,000, and more preferably from 800 to 8,000, from the viewpoints of dispersibility and aggregation property. Further, the content ratio of the side chain having an anionic group with respect to the total mass of the graft polymer is preferably from 1% by mass to 40% by mass, and more preferably from 1% by mass to 30% by mass, from the viewpoints of dispersibility and aggregation property.

The dispersant according to the invention preferably contains at least one type of repeating units represented by the following Formula (1) in the main chain. When a group containing an aromatic group bonds to the main chain through a linking group, as shown in the following Formula (1), for example, the adsorptivity to the pigment may become higher, and the dispersibility and stability may be enhanced.

Formula (1)

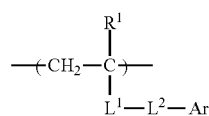

(1)

In Formula (1), $R^1$ represents a hydrogen atom or a methyl group. $L^1$ represents —COO—, —OCO—, —CONR$^2$— (wherein $R^2$ represents a hydrogen atom or an alkyl group having from 1 to 6 carbon atoms), or a substituted or unsubstituted phenylene group. Among them, $L^1$ preferably represents —COO—, or a substituted or unsubstituted phenylene group, from the viewpoints of the dispersibility and stability.

$L^2$ represents a single bond, a divalent linking group selected from the following group of linking groups, or a divalent linking group formed from a combination of two or more divalent linking groups selected from the following group of linking groups.

(Group of Linking Groups)

Alkylene groups each having from 1 to 12 carbon atoms; alkenylene groups each having from 2 to 12 carbon atoms; alkyl ether groups each having from 2 to 12 carbon atoms; —CO—; —NR$^3$— (wherein $R^3$ represents a hydrogen atom or an alkyl group having from 1 to 6 carbon atoms); —O—; —S—; —SO—; and —SO$_2$—.

The above alkylene groups have from 1 to 12 carbon atoms, and preferably have from 1 to 6 carbon atoms. Further, the above alkenylene groups have from 2 to 12 carbon atoms, and preferably have from 2 to 4 carbon atoms. Furthermore, the above alkyl ether groups have from 2 to 12 carbon atoms, and preferably have from 2 to 6 carbon atoms. Here, the above alkylene groups, alkenylene groups, and alkyl ether groups, each independently, may be substituted by a substituent (for example, an alkyl group having from 1 to 6 carbon atoms, a halogen atom, a cyano group, an alkoxy group having from 1 to 6 carbon atoms, or the like), if possible.

In the invention, from the viewpoint of dispersion stability, $L^2$ preferably represents a divalent linking group formed from at least one selected from the group consisting of alkylene groups each having from 1 to 6 carbon atoms, alkyl ether groups each having from 2 to 12 carbon atoms, —CO—, —NR$^3$— (wherein $R^3$ represents a hydrogen atom or an alkyl group having from 1 to 6 carbon atoms), and —O—. $L^2$ more preferably represents a divalent linking group formed from at least one selected from the group consisting of alkylene groups each having from 1 to 4 carbon atoms, alkyl ether groups each having from 2 to 6 carbon atoms, —CO—, —NH— and —O—.

Ar in Formula (1) represents a group including an aromatic ring, and preferably represents a monovalent group derived from benzene, a condensed ring aromatic compound having 8 or more carbon atoms, a heterocyclic compound condensed with (an) aromatic ring(s), or a compound containing two or more benzene rings linked to each other.

The condensed ring aromatic compound having 8 or more carbon atoms is an aromatic compound which has 8 or more carbon atoms and is configured to include an aromatic ring formed of two or more benzene rings condensed with each other, and/or at least one aromatic ring and an alicyclic hydrocarbon condensed with the aromatic ring. Specific examples thereof include naphthalene, anthracene, fluorene, phenanthrene, and acenaphthene.

The heterocyclic compound condensed with (an) aromatic ring(s) is a compound of a condensed ring which is formed of an aromatic compound that does not contain a heteroatom (preferably, a benzene ring) and a cyclic compound that has a heteroatom, being at least condensed together. Herein, it is preferred that the cyclic compound that has a heteroatom is a five-membered ring or a six-membered ring. The heteroatom is preferably a nitrogen atom, an oxygen atom, or a sulfur atom. The cyclic compound that has a heteroatom may have plural heteroatoms, and in this case, the heteroatoms may be the same or different from each other. Specific examples of the heterocyclic compound condensed with (an) aromatic ring(s) include phthalimide, naphthalimide, acridone, carbazole, benzoxazole, and benzothaizole.

The compound containing two or more benzene rings linked to each other means a compound containing two or more benzene rings which are linked to each other through a single bond, a divalent linking group, or a trivalent linking group. It is preferable that the divalent linking group is a divalent linking group selected from the group consisting of alkylene groups each having from 1 to 4 carbon atoms, —CO—, —O—, —S—, —SO—, —SO$_2$—, and combinations thereof. Examples of the trivalent liking group include a methine group.

Herein, the benzene rings may be linked to each other through plural linking groups, and the plural linking groups may be the same or different from each other. The number of the benzene rings is preferably from 2 to 6, and more preferably 2 or 3. Specific examples of the compound containing two or more benzene rings linked to each other include biphenyl, triphenylmethane, diphenylmethane, diphenyl ether, and diphenyl sulfone.

Ar in Formula (1) preferably represents a monovalent group derived from benzene, naphthalene, biphenyl, triphenylmethane, phthalimide, naphthalimide, acridone, fluorene, anthracene, phenanthrene, diphenylmethane, or carbazole, and more preferably represents a monovalent group derived from benzene, naphthalene, biphenyl, phthalimide, naphthalimide, or acridone, from the viewpoints of dispersibility and stability over time of the pigment.

Herein, for example, "a monovalent group derived from naphthalene" means a monovalent group which is produced by removing one hydrogen atom from naphthalene, and the position at which the hydrogen atom is removed is not particularly limited.

Ar may have a substituent. Examples of the substituent may include a monovalent substituent such as an alkyl group, an alkoxy group, an alkylcarbonyl group, an alkylcarbonyloxy group, an alkyloxycarbonyloxy group, a halogen group, and a cyano group, and a divalent substituent such as an oxo group. Preferable examples of the substituent may include an alkyl group having from 1 to 10 carbon atoms, an alkoxy group having from 1 to 10 carbon atoms, an alkylcarbonyl group having from 1 to 10 carbon atoms, an alkylcarbonyloxy group having from 1 to 10 carbon atoms, a chloro group, a cyano group, and an oxo group.

Examples of Ar having a divalent substituent may include anthraquinone and naphthoquinone.

Further, these substituents may be substituted by another substituent, and preferable substituents in this case are the same as those described above. Further, when two or more substituents exist, these substituents may be the same or different from each other. Further, if possible, these substituents may bond to each other to form a ring.

In the present invention, from the viewpoint of dispersion stability, it is preferable that, in the repeating unit represented by Formula (1), $L^1$ represents —COO— or a substituted or unsubstituted phenylene group; $L^2$ represents a divalent linking group formed from at least one selected from the group consisting of alkylene groups each having from 1 to 6 carbon atoms, —CO—, —NR$^3$— (wherein R$^3$ represents a hydrogen atom or an alkyl group having from 1 to 6 carbon atoms), and —O—; $R^2$ represents a hydrogen atom, an alkyl group, an alkyloxy group, or a halogen atom; and Ar represents a monovalent group derived from benzene, naphthalene, biphenyl, triphenylmethane, phthalimide, naphthalimide, acridone, fluorene, anthracene, phenanthrene, diphenylmethane, anthraquinone, or carbazole. It is more preferable that $L^1$ represents a divalent linking group formed from at least one selected from the group consisting of alkylene groups each having from 1 to 4 carbon atoms, —CO—, —NH—, and —O—; $R^2$ represents a hydrogen atom or a halogen atom; and Ar represents a monovalent group derived from benzene, naphthalene, biphenyl, phthalimide, naphthalimide, anthraquinone, or acridone.

Specific examples of the monomer that may be used for forming a repeating unit represented by Formula (1) are shown below, but the present invention is not limited to the following specific examples.

A-1
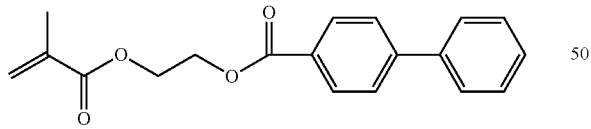

A-2
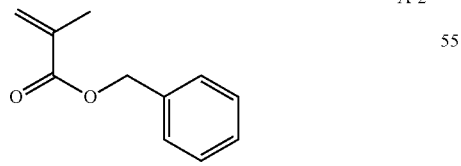

A-3
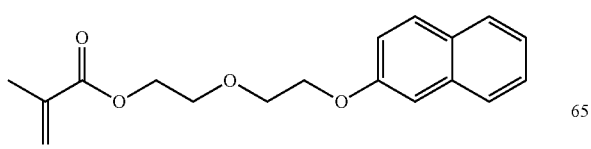

A-4
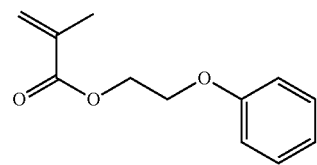

A-5
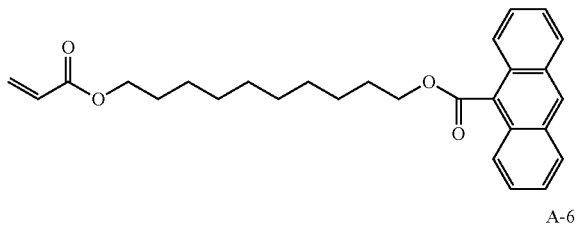

A-6
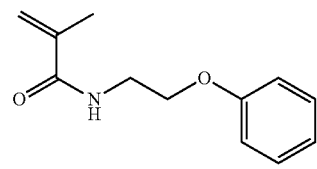

A-7
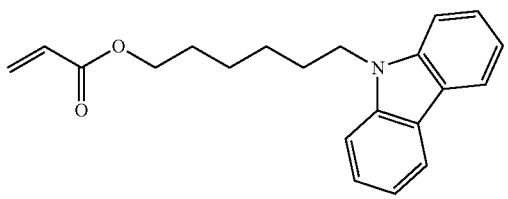

A-8
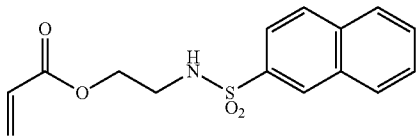

A-9
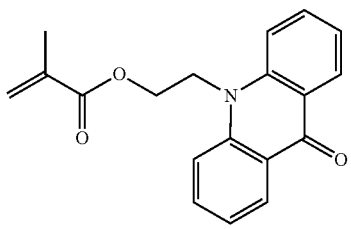

A-10
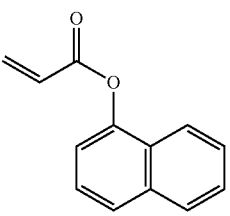

A-11
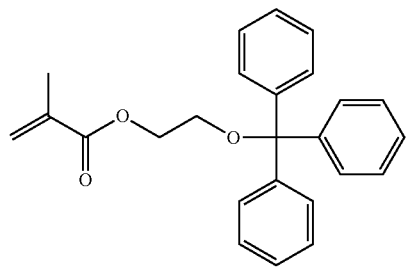
A-12
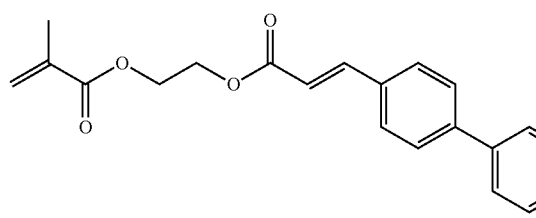
A-13
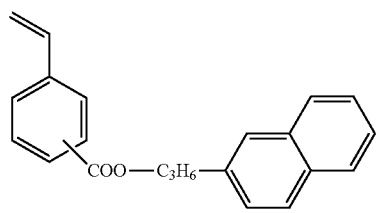
A-14
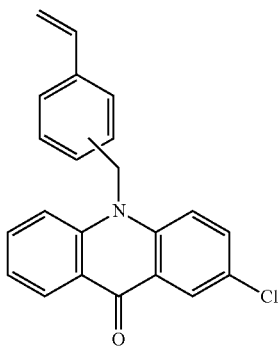
A-15
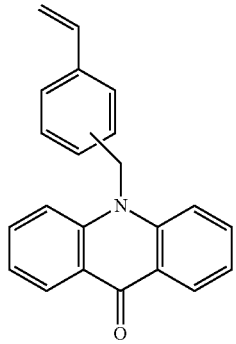
A-16
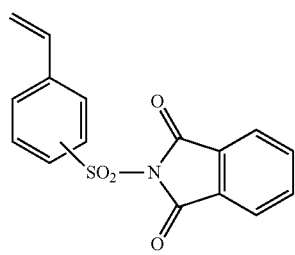
A-17
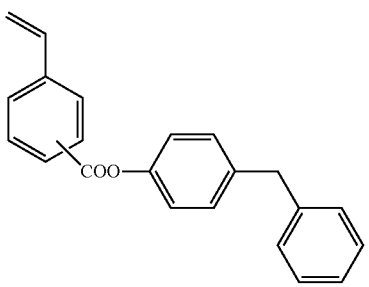
A-18
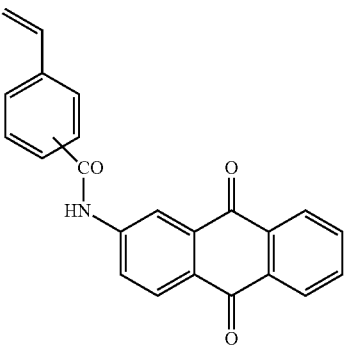
A-19
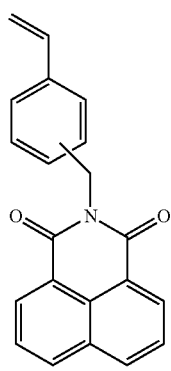
A-20
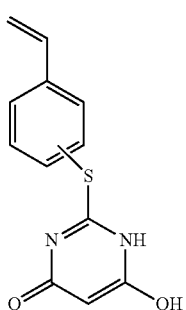

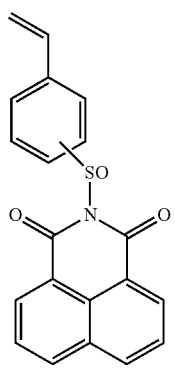

A-21

The content of the repeating unit represented by the above Formula (1) in the graft polymer is preferably 90% by mass or less, more preferably from 3% by mass to 80% by mass, and even more preferably from 3% by mass to 75% by mass, with respect to the total mass of the graft polymer, from the viewpoints of pigment dispersibility, stability, and ejection property.

In the present invention, the graft polymer including an anionic group at a side chain thereof preferably includes at least one type of repeating units containing a side chain including an anionic group and at least one type of repeating units represented by the above Formula (1), and may further include one or more additional repeating units, and the additional repeating unit is not particularly limited. For example, repeating units derived from a generally used monomer described in "Polymer Handbook 4th edition, John Wiley & Sons" may be described.

The above additional repeating unit may be a hydrophilic repeating unit or a hydrophobic repeating unit.

Specific examples of a monomer that may be used for forming the hydrophilic repeating unit may include those described as the examples of the monomers having an anionic group, monomers having a nonionic hydrophilic group, and monomers having a cationic group in the description of the side chain as described above. Specific examples of a monomer that may be used for forming the hydrophobic repeating unit may include those described as the examples of the monomers that may be used for forming the hydrophobic repeating unit in the description of the side chain as described above.

One kind of these additional repeating units may be contained in the graft polymer, or a combination of two or more of them may be contained in the graft polymer.

The content of the additional repeating unit in the graft polymer is not particularly limited, and may be appropriately selected according to the needs. For example, the content may be from 0% by weight to 95% by weight. The content is preferably from 0% by weight to 90% by weight, and more preferably from 0% by weight to 85% by weight.

The graft polymer according to the invention may be synthesized using a known method. In view of easiness of controlling the structure of graft polymer and easiness of synthesis, the graft polymer is preferably synthesized by a so-called macromonomer method, in which a macromonomer having at least one of an anionic group or a functional group capable of being transformed to an anionic group and, at a terminal, an ethylenically unsaturated bond is used, and the macromonomer is copolymerized with a monomer for forming the main chain. The synthesis method of macromonomer and the synthesis method of graft polymer by a macromonomer method are disclosed, for example, in "Kobunshi (Polymer)", vol. 31, page 988 (1982).

The macromonomer used for the above macromonomer method is not particularly limited as far as the macromonomer has an ethylenically unsaturated bond at a terminal and includes a repeating unit containing at least one of an anionic group or a functional group capable of being transformed to an anionic group (hereinafter, may be collectively referred to as "an anionic functional group"), and may further include a repeating unit containing a functional group other than the anionic functional group.

Examples of the functional group capable of being transformed to an anionic group include carboxylic acid esters (for example, t-butyl ester, benzyl ester, and 2-tetrahydropyranyl ester), sulfonic acid ester, and phosphoric acid ester.

Further, examples of the repeating unit containing a functional group other than the anionic functional group include the above-described repeating units having a nonionic hydrophilic group and hydrophobic repeating units.

The macromonomer may be a random copolymer having the respective repeating units introduced irregularly, or may be a block copolymer having the respective repeating units introduced regularly. When the macromonomer is a block copolymer, the respective repeating units may be introduced in any order, and the same constituent component may be used twice or more times. It is preferable that the macromonomer is a random copolymer from the viewpoints of versatility and productivity.

The weight average molecular weight of the macromonomer is preferably in a range of from 800 to 20,000, and particularly preferably from 800 to 8,000. The content of the macromonomer in the dispersant according to the invention is preferably in a range of from 1% by mass to 40% by mass, and more preferably in a range of from 1% by mass to 30% by mass, with respect of the total mass of the dispersant.

Specific examples of the macromonomer according to the present invention are shown below, but the present invention is not limited thereto. Note that, the subscript at the repeating unit in the specific examples represents the content of the repeating unit in the macromonomer, on the basis of mass.

M-1

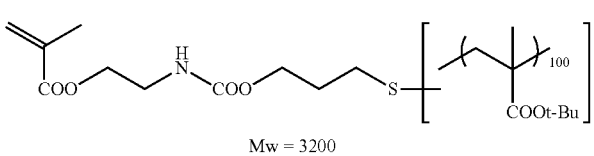

Mw = 3200

-continued
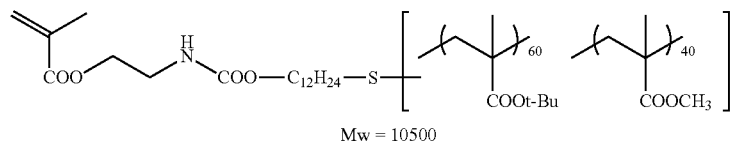
M-2
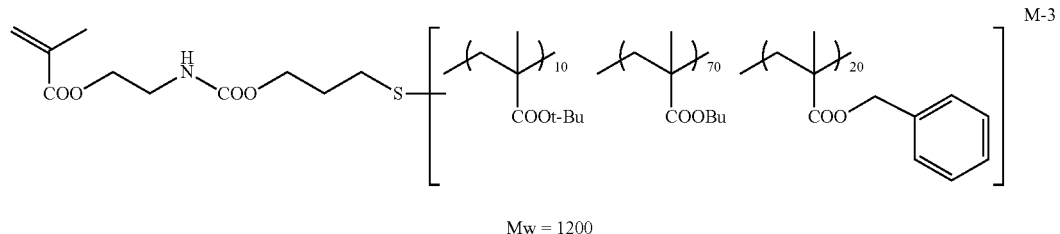
M-3
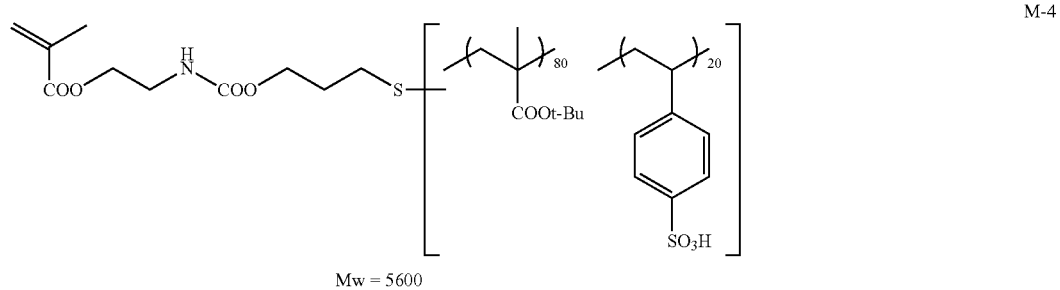
M-4
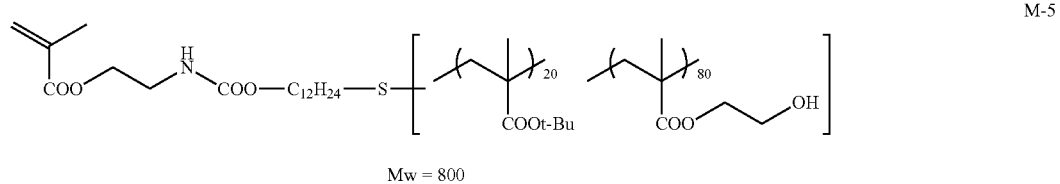
M-5
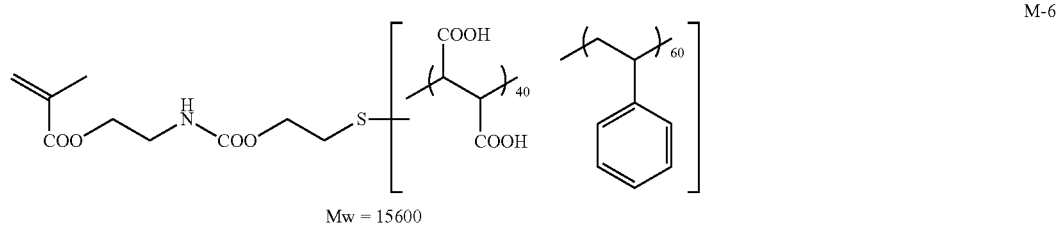
M-6
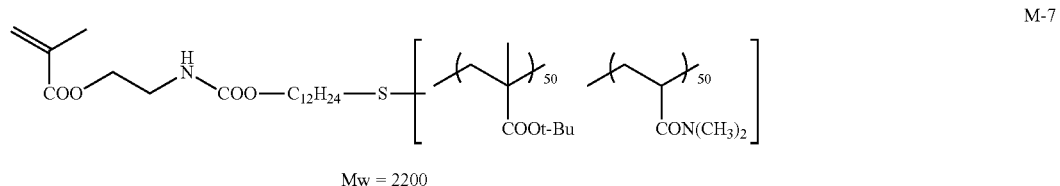
M-7
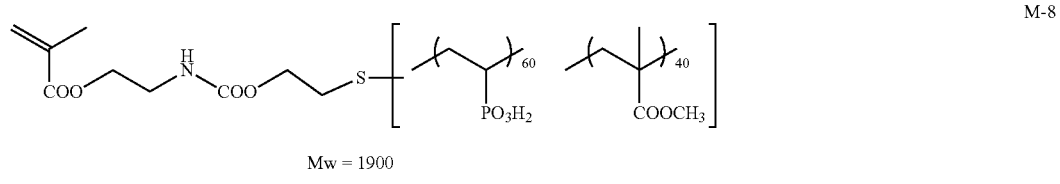
M-8
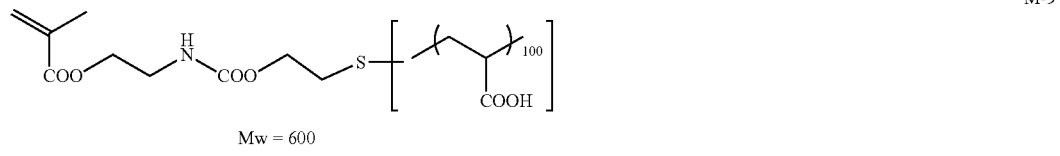
M-9

The dispersant, which is used in the invention, may be synthesized by a method selected from various polymerization methods including solution polymerization, precipitation polymerization, suspension polymerization, bulk polymerization, and emulsion polymerization. The polymerization reaction can be carried out by a known operation such as a batch, semi-continuous, or continuous operation.

Examples of a method for initiating polymerization include a method of using a radical initiator and a method of irradiating with light or radioactive rays. These polymerization methods and methods for initiating polymerization are described in, for example, "Kobunshi Gosei Hoho (Polymer Synthesis Method)" by Teiji Tsuruta, revised edition (published by Nikkan Kogyo Shimbun, Ltd., 1971) and "Kobunshi Gosei no Jikkenho (Experimental Method of Polymer Synthesis)" written by Takayuki Ohtsu and Masaetsu Kinoshita, published by Kagaku-Dojin Publishing Co., Inc. in 1972, pages 124 to 154.

Among the above polymerization methods, a solution polymerization method using a radical initiator is particularly preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These organic solvents may be used alone or as a mixture of two or more of them, or may be mixed with water to give a mixture solvent.

The temperature for polymerization should be set in relation to the molecular weight of the intended polymer, the kind of the initiator, and the like, while it is usually from about 0° C. to about 100° C., and it is preferable that polymerization is carried out under the temperature of from 50° C. to 100° C.

The reaction pressure may be appropriately selected, while it is usually from 1 kg/cm$^2$ to 100 kg/cm$^2$, and is particular preferably from about 1 kg/cm$^2$ to about 30 kg/cm$^2$. The reaction time may be from about 5 hours to about 30 hours. The obtained polymer may be subjected to purification such as reprecipitation.

The range of molecular weight of the dispersant used in the invention is preferably from 1,000 to 1,000,000, more preferably from 2,000 to 500,000, and even more preferably from 3,000 to 150,000, in terms of weight average molecular weight (Mw).

When the molecular weight is within the above range, the polymer tends to exhibit a good steric repulsion effect as a dispersant, and the steric effect offers a tendency of taking less time for adsorption to a pigment, which is preferable.

Further, the dispersant preferably has a molecular weight distribution (denoted by weight average molecular weight value (Mw)/number average molecular weight value (Mn)) of from 1 to 6, and more preferably from 1 to 5.

It is preferable that the molecular weight distribution is within the above range from the viewpoints of reduction of time for dispersing the pigment and stability over time of the dispersion. Here, the number average molecular weight and the weight average molecular weight are molecular weights detected by using solvent THF (tetrahydrofuran) and a differential refractometer through a GPC (gel permeation chromatography) analyzer with the use of columns of TSKgel GMHxL, TSKgel G4000HxL, and TSKgel G2000HxL (all trade names, manufactured by Tosoh Corp.). For the conversion, styrene was used as a standard reference material.

Specific examples of the dispersant are shown below, but the present invention is not limited to the following specific examples.

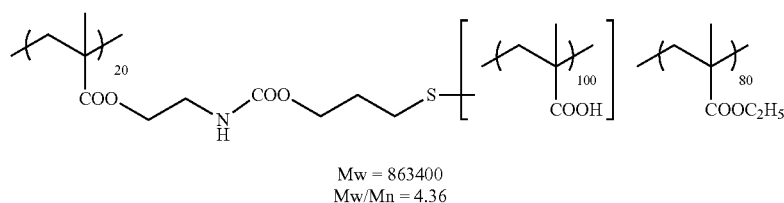

C-1

Mw = 863400
Mw/Mn = 4.36

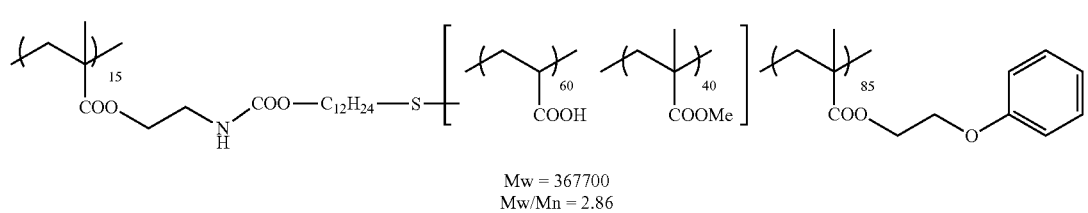

C-2

Mw = 367700
Mw/Mn = 2.86

-continued
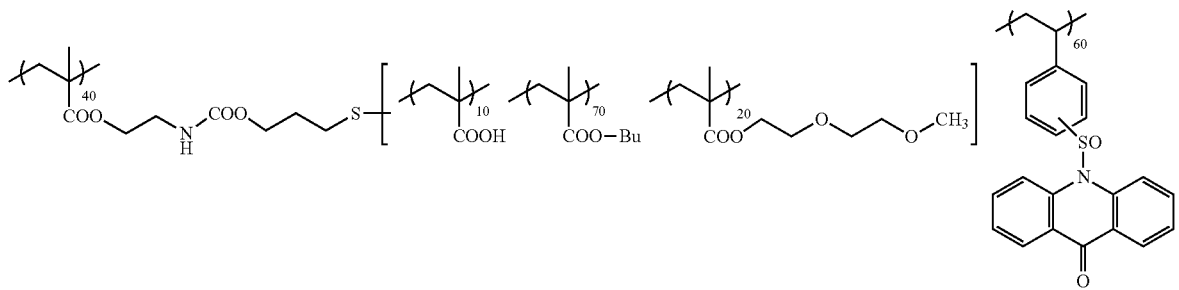
Mw = 106000
Mw/Mn = 3.39
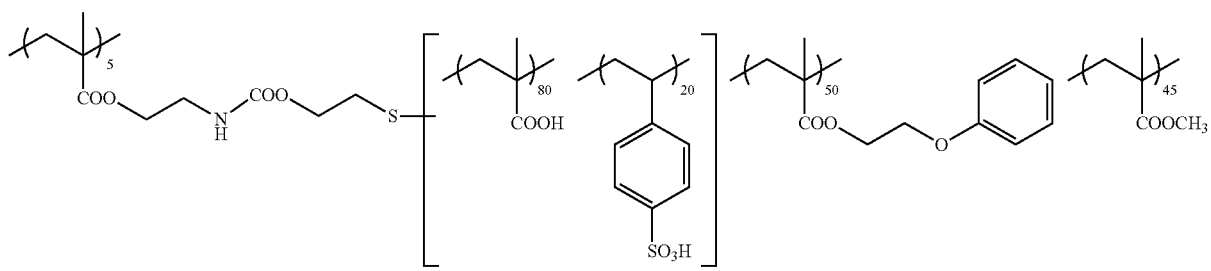
Mw = 45000
Mw/Mn = 3.50
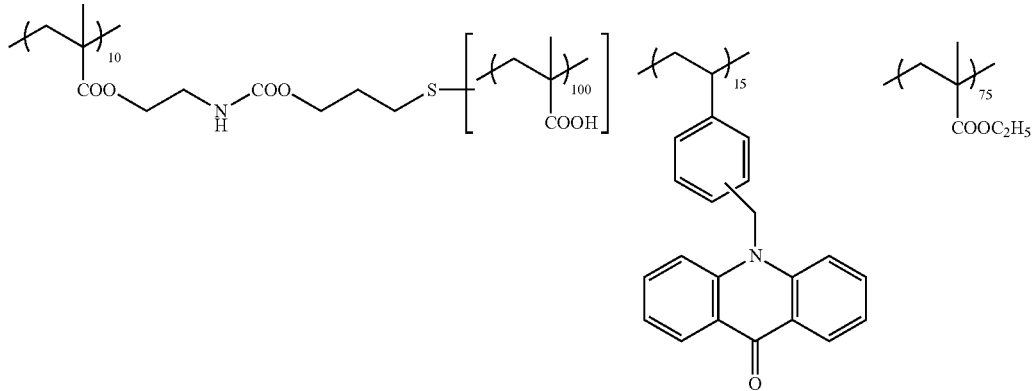
Mw = 25300
Mw/Mn = 3.06
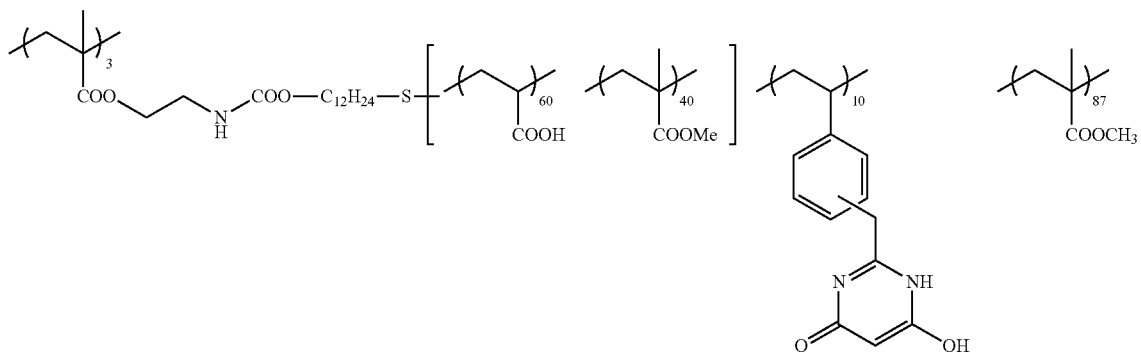
Mw = 1900
Mw/Mn = 1.86

-continued
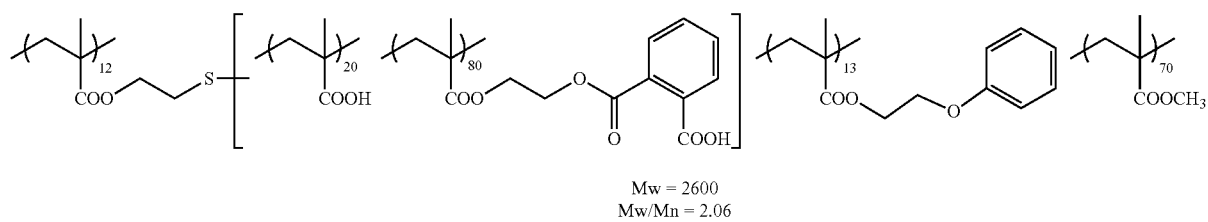
C-7
Mw = 2600
Mw/Mn = 2.06
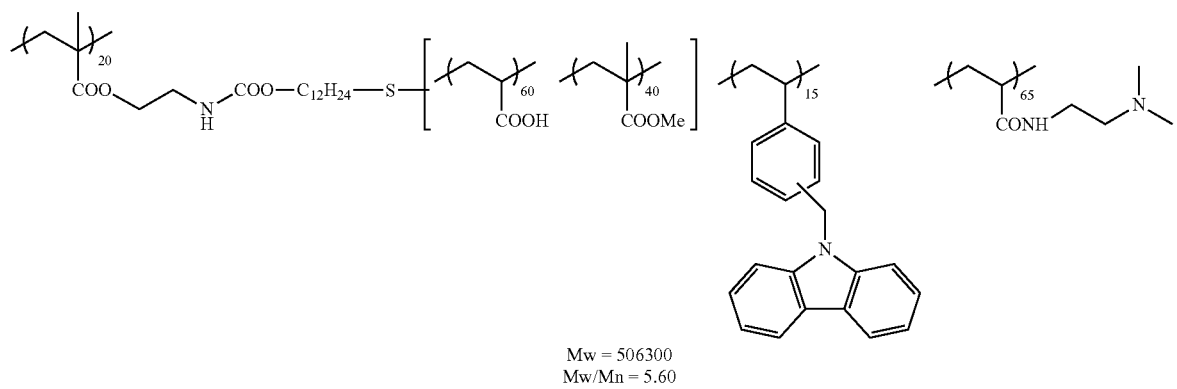
C-8
Mw = 506300
Mw/Mn = 5.60
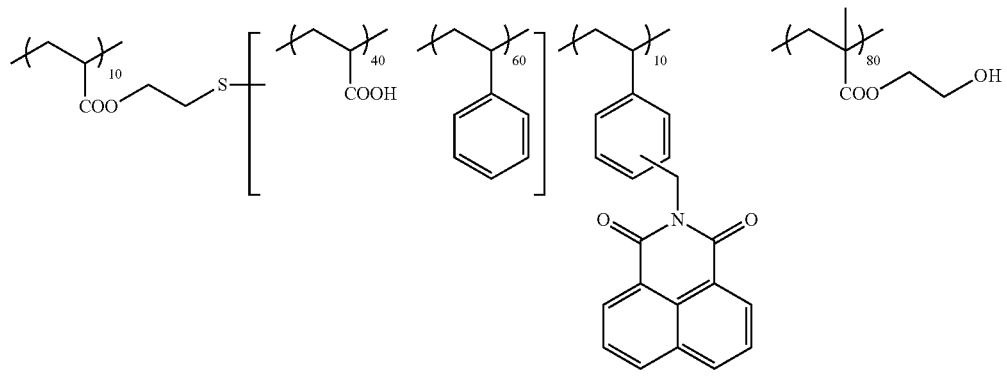
C-9
Mw = 46300
Mw/Mn = 4.55
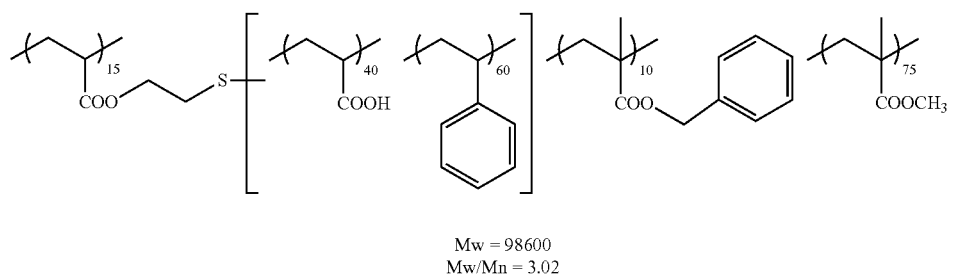
C-10
Mw = 98600
Mw/Mn = 3.02

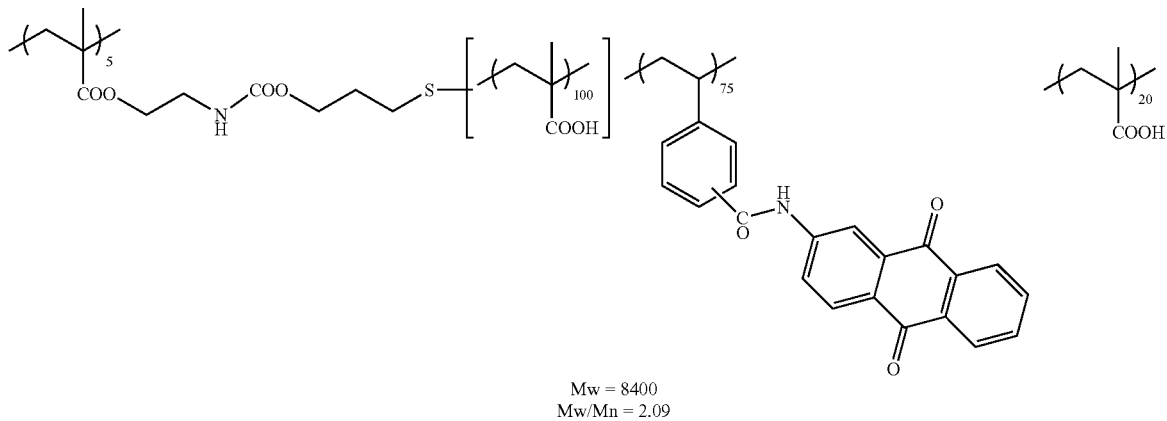

Mw = 8400
Mw/Mn = 2.09

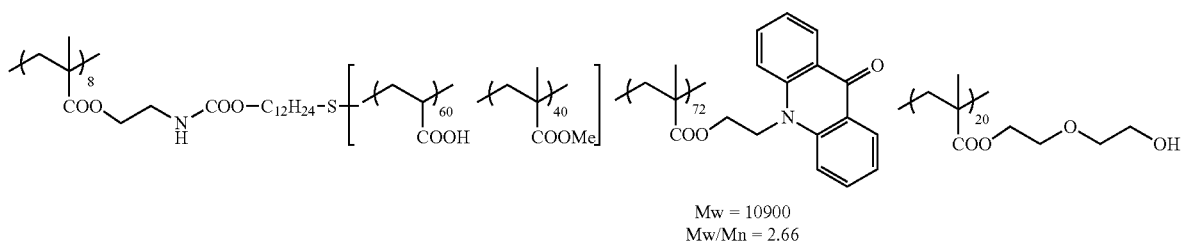

Mw = 10900
Mw/Mn = 2.66

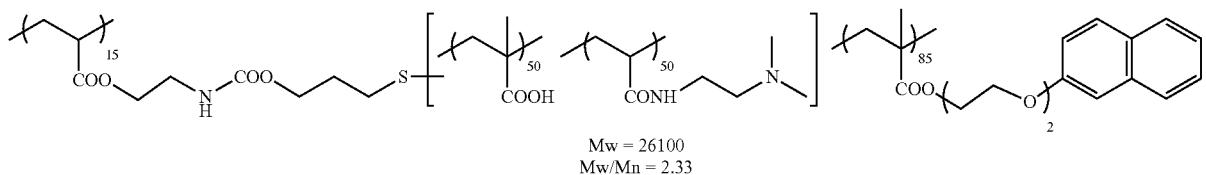

Mw = 26100
Mw/Mn = 2.33

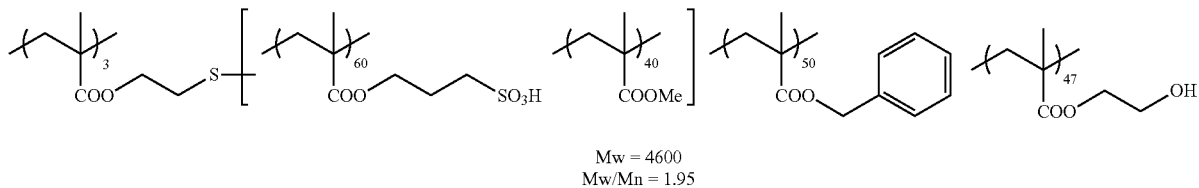

Mw = 4600
Mw/Mn = 1.95

From the viewpoints of dispersion stability, ejection property, and aggregation property, the graft polymer in the present invention preferably includes the repeating unit including a carboxy group at a side chain thereof and includes 90% by mass or less of the repeating unit represented by the above Formula (1). The graft polymer more preferably includes from 1% by mass to 40% by mass of the repeating unit including a side chain which includes a repeating unit including a carboxy group and has a weight average molecular weight of from 800 to 20,000, and 3% by mass to 80% by mass of the repeating unit represented by the above Formula (1). The graft polymer even more preferably includes from 1% by mass to 30% by mass of a repeating unit including a side chain which includes a repeating unit including a carboxy group and has a weight average molecular weight of from 800 to 8,000, and 3% by mass to 75% by mass of the repeating unit represented by the above Formula (1).

The content of the graft polymer in the ink composition according to the invention is not particularly limited, while the content ratio of the pigment and the graft polymer (pigment:graft polymer; on the basis of mass) is preferably in a range of from 1:0.06 to 1:3, more preferably in a range of from 1:0.125 to 1:2, and even more preferably in a range of from 1:0.125 to 1:1.5.

The aqueous ink composition in the present invention includes the above-described graft polymer including an anionic group at a side chain thereof and pigment. It is preferred that the pigment is included as a pigment dispersion in which the pigment is dispersed by using the graft polymer including an anionic group at a side chain thereof. It is more preferred that in the pigment dispersion, at least a portion of surfaces of particles of the pigment is coated with the graft polymer.

The pigment dispersion contained in the aqueous ink composition in the invention can be prepared, for example, by the following procedure.

The pigment dispersion is preferably produced by mixing a solution containing a pigment, a dispersant (graft polymer), an organic solvent which dissolves or disperses the dispersant, a basic substance, and water as a main component (a mixing and hydration process) and then, removing at least a part of the organic solvent therefrom (a solvent removal process).

By adopting such a method of preparing a pigment dispersion, the pigment can be finely dispersed, and a pigment dispersion having excellent storage stability can be produced.

It is necessary that the organic solvent can dissolve or disperse the dispersant according to the invention. In addition, it is preferable that the organic solvent has a certain degree of affinity to water. Specifically, an organic solvent having a solubility in water at 20° C. of from 10% by mass to 50% by mass is preferable.

More specifically, the pigment dispersion can be produced by a production method including the following process (1) and process (2), but the invention is not limited thereto.

Process (1): A process of dispersing a mixture containing a pigment, a dispersant, an organic solvent which dissolves or disperses the dispersant, a solution containing a basic substance and water as a main component, and water.

Process (2): A process of removing at least a part of the organic solvent.

In process (1) above, first, the dispersant is dissolved or dispersed in an organic solvent to obtain a mixture (a mixing process). Subsequently, a dispersion liquid containing a pigment, a basic substance, and water as a main component, water, and if necessary, a surfactant or the like are added to the mixture and mixed, and the resulting mixture is subjected to dispersion processing to obtain an oil-in-water type dispersion.

The basic substance is used to neutralize the anionic groups (preferably, carboxy groups) of the dispersant. The degree of neutralization of the anionic groups is not particularly limited. Generally, it is preferable that the liquid property of the finally obtained aqueous pigment dispersion is neutral, for example, the pH is from 4.5 to 10. The value of pH may also be determined according to the desired degree of neutralization of the dispersant.

Preferable examples of the organic solvent which may be used in the invention include alcohol solvents, ketone solvents, and ether solvents. Specific examples of the alcohol solvents include ethanol, isopropanol, n-butanol, t-butanol, isobutanol, and diacetone alcohol. Specific examples of the ketone solvents include acetone, methyl ethyl ketone, diethyl ketone, and methyl isobutyl ketone. Specific examples of the ether solvents include dibutyl ether, tetrahydrofuran, and dioxane. Among these organic solvents, isopropanol, acetone, and methyl ethyl ketone are preferable, and methyl ethyl ketone is particularly preferable. The organic solvents may be used alone or plural organic solvents may be used in combination.

In producing the pigment dispersion, kneading and dispersion treatment may be carried out while applying strong shear force by using a twin roll, a triple roll, a ball mill, a thoron mill, a Disper, a kneader, a co-kneader, a homogenizer, a blender, a single-screw extruder, a twin-screw extruder, or the like. Details on kneading and dispersion are described in, for example, "Paint Flow and Pigment Dispersion" written by T. C. Patton (published by John Wily and Sons, Inc., 1964).

Further, as necessary, fine dispersion treatment with beads which have a particle diameter of from 0.01 mm to 1 mm and are made of glass, zirconia, or the like, using a vertical or horizontal sand grinder, a pin mill, a slit mill, an ultrasonic disperser, or the like may be performed.

In the method for producing the pigment dispersion according to the invention, the method of removing the organic solvent is not particularly limited, and the organic solvent can be removed by a known method such as distillation under reduced pressure.

The volume average particle diameter of the pigment in the invention is preferably 10 nm or more but less than 200 nm, more preferably 50 nm or more but less than 130 nm, and even more preferably 60 nm or more but less than 100 nm. When the volume average particle diameter is within the above range, color forming property, dispersion stability, and ejection stability in an ink jet method may become good. The volume average particle diameter of the dispersed pigment particles is a value measured by a dynamic scattering method.

For example, the pigment dispersion can be used for the ink composition for ink jet recording described below, as well as a water-based ink for writing instruments such as a ball point pen or a marker pen. In this case, in order to suppress clogging of ink-jet nozzles or pen orifices caused by drying, a low-volatile or non-volatile solvent among water-soluble organic solvents can be added. Further, a volatile solvent can be added, in order to enhance penetrability into the recording medium.

The aqueous ink composition in the present invention contains an aqueous medium. The aqueous medium includes at least water, and may further include at least one water-soluble organic solvent. The water-soluble organic solvents can be contained, for example, as an anti-drying agent or a permeation accelerator.

When the aqueous ink composition according to the present invention is particularly applied to an image recording method of an ink jet system, the anti-drying agent can effectively prevent clogging of nozzles, which may possibly be generated by drying of an ink at an ink spray orifice.

The anti-drying agent is preferably a water-soluble organic solvent having a vapor pressure lower than that of water. Specific examples of the anti-drying agent include polyhydric alcohols such as those represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohol such as ethylene glycol monomethyl ether, ethylene glycol monoethyl ether, diethylene glycol monomethyl ether, diethylene glycol monoethyl ether, triethylene glycol monoethyl ether, and triethylene glycol monobutyl ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide, and 3-sulfolene; polyfunctional compounds such as diacetone alcohol and diethanolamine; and urea derivatives. Among them, polyhydric alcohols such as glycerin and diethylene glycol are preferable as the anti-drying agent. The above anti-drying agents may be used alone or in a combination of two or more of them. It is preferable that the anti-drying agent is contained in the ink in an amount of from 5% by mass to 50% by mass.

The permeation accelerator is preferably used for the purpose of well permeating the ink into a recording medium (printing paper). Specific examples of the permeation accelerator, which can be preferably used, include alcohols such as ethanol, isopropanol, butanol, diethylene glycol monobutyl ether, triethylene glycol monobutyl ether, and 1,2-hexanediol; sodium lauryl sulfate; sodium oleate; and nonionic surfactants. When the permeation accelerator is contained in the ink composition in an amount of from 5% by mass to 30% by mass, sufficient effect is exhibited. The permeation accelerator is preferably used within the range of the addition amount such that bleeding of printing and print-through are not generated.

The water-soluble organic solvent can also be used for the purpose of adjusting viscosity, other than the above purposes. Specific examples of the water-soluble organic solvent that can be used for adjusting viscosity include alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

The water-soluble organic solvents may be used alone, or in a combination of two or more of them.

The content of the aqueous medium in the aqueous ink composition according to the invention is preferably from 10% by mass to 95% by mass, more preferably from 30% by mass to 90% by mass, from the viewpoints of prevention of drying, penetrability into the adherend, and liquid properties such as viscosity. When the content of the aqueous medium is within the above range, drying speed of the ink composition, penetrability into the adherend, and liquid properties such as viscosity may be adjusted to be in proper states.

Further, the content of water in the aqueous ink composition is appropriately selected in accordance with the purposes but, generally, the content of water in the aqueous ink composition is preferably from 10% by mass to 95% by mass, and more preferably from 30% by mass to 90% by mass.

The aqueous ink composition according to the invention may further contain resin particles for the purpose of improving fixability and rub resistance of the printed matter. Examples of he resin particles that can be used in the present invention include particles of an acrylic resin, a vinyl acetate resin, a styrene-butadiene resin, a vinyl chloride resin, an acryl-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin, a fluororesin, or the like, and latex thereof. Preferable examples of the resin particles may include particles of an acrylic resin, an acryl-styrene resin, a styrene resin, a crosslinked acrylic resin, or a crosslinked styrene resin.

The resin particles may also be used in the state of latex.

In the present invention, the resin particles preferably has a weight average molecular weight of from 10,000 to 300,000, and more preferably from 10,000 to 100,000.

A mean particle diameter of the resin particles is preferably in a range of from 1 nm to 300 nm, more preferably in a range of from 1 nm to 100 nm, and particularly preferably in a range of from 1 nm to 30 nm. There is no particular limitation concerning particle diameter distribution of the resin particles, and the particles may have a wide particle diameter distribution or may have a monodispersed particle diameter distribution. Further, a mixture of two or more types of resin particles each having a monodispersed particle diameter distribution may also be used.

The addition amount of the resin particles is preferably from 0.5% by mass to 20% by mass, more preferably from 3% by mass to 20% by mass, and even more preferably from 5% by mass to 15% by mass, with respect to the aqueous ink composition.

Further, the glass transition temperature Tg of the resin particles is preferably 30° C. or higher, more preferably 40° C. or higher, and even more preferably 50° C. or higher.

The aqueous ink composition according to the invention may further contain an aqueous UV curable material including a water-soluble polymerizable compound having an ethylenically unsaturated bond and a polymerization initiator, for the purpose of improving fixability and rub resistance of the image on the recording medium.

Hereinafter, the water-soluble polymerizable compound having an ethylenically unsaturated bond and the polymerization initiator, which can be used in the present invention, are explained.

(Water-Soluble Polymerizable Compound Having Ethylenically Unsaturated Bond)

The aqueous ink composition according to the invention preferably contains at least one water-soluble compound having an ethylenically unsaturated bond (hereinafter, may be referred to as a "specific polymerizable compound").

The specific polymerizable compound is a water-soluble compound having at least one radically polymerizable ethylenically unsaturated bond in the molecule, and may have a chemical form of a monomer, an oligomer, a polymer, or the like. The specific polymerizable compounds may be used alone, or two or more of them may be used in combination at any ratio for the purpose of improving the intended properties. It is preferable to use two or more of them in combination from the viewpoint of controlling performance such as reactivity and physical properties. Further, from the viewpoint of ejection stability of the ink, it is preferable to use a compound which is satisfactorily soluble in water and is less likely to be precipitate in the aqueous ink composition.

The specific polymerizable compound used in the present invention dissolves in distilled water at 25° C. at a proportion of 2% by mass or more, but the specific polymerizable compound in the invention preferably dissolves in distilled water at a proportion of 15% by mass or more, and particularly preferably is homogeneously mixed with water at any proportion.

Examples of the specific polymerizable compound include unsaturated carboxylic acid such as acrylic acid, methacrylic acid, itaconic acid, crotonic acid, isocrotonic acid, or maleic acid, ester derivatives thereof, and salts thereof; acrylamide, methacrylamide, and derivatives thereof; anhydrides having an ethylenically unsaturated group; acrylonitrile; styrene; and various unsaturated polyesters, unsaturated polyethers, unsaturated polyamides, unsaturated urethanes, vinyl ethers, and allyl ethers. The specific polymerizable compound is preferably at least one selected from the group consisting of acrylic acid, methacrylic acid, ester derivatives thereof, and salts thereof; and acrylamide, methacrylamide, and derivatives thereof. The specific polymerizable compound is more preferably at least one selected from the group consisting of monoesters of acrylic acid or methacrylic acid (hereinafter, may be referred to as "monoacrylates"); esters of a polyol compound and acrylic acid or methacrylic acid (hereinafter, may be referred to as "polyfunctional acrylate monomers" or "polyfunctional acrylate oligomers"); acrylamide, methacrylamide, and derivatives thereof.

From the viewpoint of imparting solubility in water, it is preferable that the specific polymerizable compound used in the invention has at least one selected from the group consisting of a polyoxyethylene chain, a polyoxypropylene chain, an ionic group (for example, a carboxy group, a sulfo group, or the like), or a hydroxy group.

When the specific polymerizable compound has a polyoxyethlene chain or a polyoxypropylene chain, the unit number of oxyethylene units or oxypropylene units is preferably in a range of from 1 to 10, and more preferably in a range of from 1 to 5. When the unit number is 10 or less, hardness of a film after curing, adhesion to the recording medium, and the like are improved.

Among the specific polymerizable compounds, specific examples of the monoacrylates, polyfunctional acrylate monomers, polyfunctional acrylate oligomers, and (meth) acrylamide derivatives, which are particularly preferable, include compounds having the structure shown below. It should be construed that the specific polymerizable compound used in the present invention is not limited to these examples.

In addition to the above exemplary compounds, preferable examples of the specific polymerizable compound include methacrylic acid and compounds having an ionic group such as potassium salt of 3-sulfopropylacrylate.

In the invention, the specific polymerizable compounds may be used alone, or in a combination of two or more of them.

In the invention, from the viewpoints of further improving the sensitivity, bleeding resistance, and adhesion to the recording medium, it is preferable to use a combination of at least one monoacrylate and a polyfunctional acrylate monomer or polyfunctional acrylate oligomer which has a molecular weight of 400 or more, and preferably 500 or more. Particularly, in the ink composition used for recording on a soft recording medium such as PET (polyethylene terephthalate) film or PP (polypropylene) film, it is preferable to use a combination of monoacrylate and a polyfunctional acrylate monomer or a polyfunctional acrylate oligomer, which are selected from the above compound group, from the viewpoints of imparting flexibility to the film, enhancing the adhesion, and also enhancing the film strength.

Further, an embodiment in which at least three polymerizable compounds including a monofunctional monomer, a bifunctional monomer, and a polyfunctional monomer of tri- or higher-functionality are used in combination is preferable, from the viewpoints of maintaining safety and further improving the sensitivity, bleeding resistance, and adhesion to a recording medium.

Exemplary Compound 2-1

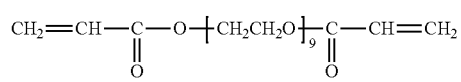

Exemplary Compound 2-2

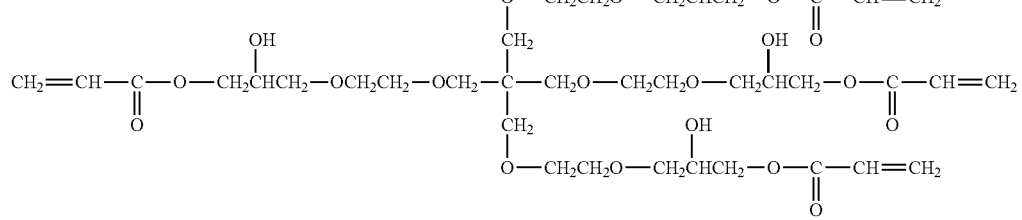

Exemplary Compound 2-3

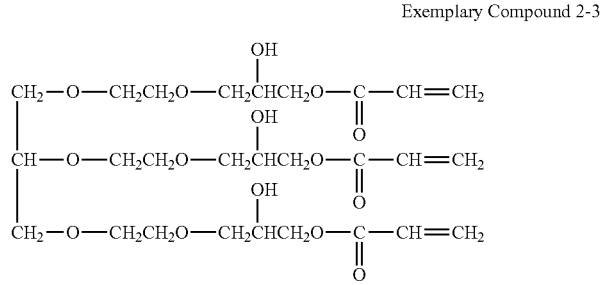

Exemplary Compound 2-4

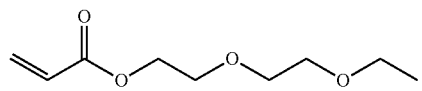

Exemplary Compound 2-5

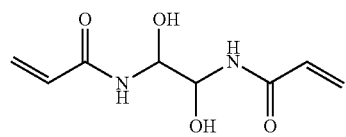

The content of the compound having an ethylenically unsaturated bond in the aqueous ink composition of the present invention is preferably from 1% to 30% on the basis of mass, and more preferably from 5% to 20%, with respect to the total mass of the aqueous ink composition.

[Polymerization Initiator]

It is preferable that the aqueous ink composition of the invention further contains at least one polymerization initiator. The polymerization initiator is not particularly limited as far as it exhibits a good polymerization initiating ability, and may be selected from known polymerization initiators. Among the polymerization initiators, water-soluble polymerization initiators are preferable. Concerning the degree of "solubility in water", the polymerization initiator preferably dissolves in distilled water under the condition of 25° C. at a proportion of 0.5% by mass or more, more preferably 1% by mass or more, and particularly preferably 3% by mass or more.

Among the polymerization initiators, a polymerization initiator selected from the group consisting of α-aminoketone compounds and acylphosphine oxide compounds is preferable.

As the α-aminoketone compound, a compound having a structure represented by the following Formula (5) is preferable.

Formula (5)

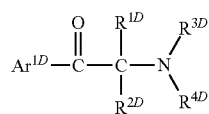

In Formula (5) above, $Ar^{1D}$ represents a phenyl group substituted by —$SR^{51}$ or —$N(R^{52})(R^{53})$; and $R^{51}$ represents a hydrogen atom or an alkyl group. $R^{52}$ and $R^{53}$ each independently represent a hydrogen atom, an alkyl group having from 1 to 12 carbon atoms, an alkyl group which has from 2 to 4 carbon atoms and is substituted by an alkoxy group having from 1 to 4 carbon atoms, or an alkenyl group having from 3 to 5 carbon atoms. $R^{52}$ and $R^{53}$ may bond to each other to form an alkylene group having from 3 to 7 carbon atoms, and the alkylene group may include —O— or —$N(R^{54})$— in the alkylene chain. $R^{54}$ represents an alkyl group having from 1 to 4 carbon atoms.

$R^{1D}$ and $R^{2D}$ each independently represent an alkyl group having from 1 to 8 carbon atoms. $R^{1D}$ and $R^{2D}$ may bond to each other to form an alkylene group having from 2 to 9 carbon atoms. $R^{3D}$ and $R^{4D}$ each independently represent a hydrogen atom, an alkyl group having from 1 to 12 carbon atoms, an alkyl group which has from 2 to 4 carbon atoms and is substituted by an alkoxy group having from 1 to 4 carbon atoms, or an alkenyl group having from 3 to 5 carbon atoms. Here, $R^{3D}$ and $R^{4D}$ may bond to each other to form an alkylene group having from 3 to 7 carbon atoms, and the alkylene group may include —O— or —$N(R^{54})$— in the alkylene chain. $R^{54}$ represents an alkyl group having from 1 to 4 carbon atoms.

Examples of the α-aminoketone compound include 2-methyl-1-phenyl-2-morpholinopropan-1-one, 2-methyl-1-(4-hexylphenyl)-2-morpholinopropan-1-one, 2-ethyl-2-dimethylamino-1-(4-morpholinophenyl)-butan-1-one. Further, there are commercially available products such as IRGACURE series (trade name) manufactured by BASF (former Ciba), for example, IRGACURE 907, IRGACURE 369, and IRGACURE 379 (all trade names), and they are also the α-aminoketone compounds.

As the acylphosphine oxide compound described above, a compound represented by the following Formula (6) or Formula (7) is preferable.

Formula (6)

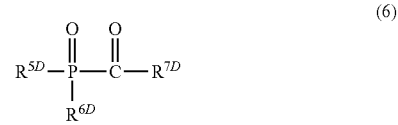

In Formula (6) above, $R^{5D}$ and $R^{6D}$ each independently represent an aliphatic group, an aromatic group, an aliphatic oxy group, an aromatic oxy group, or a heterocyclic group; and $R^{7D}$ represents an aliphatic group, an aromatic group, or a heterocyclic group.

Examples of the aliphatic group represented by $R^{5D}$, $R^{6D}$, or $R^{7D}$ include an alkyl group, a substituted alkyl group, an alkenyl group, a substituted alkenyl group, an alkynyl group, a substituted alkynyl group, an aralkyl group, and a substituted aralkyl group. Among them, an alkyl group, a substituted alkyl group, an alkenyl group, a substituted alkenyl group, an aralkyl group, and a substituted aralkyl group are preferable, and an alkyl group and a substituted alkyl group are particularly preferable. Further, the aliphatic group may be a cyclic aliphatic group or a chain aliphatic group. The chain aliphatic group may be branched.

The alkyl group may be a straight-chain, branched, or cyclic alkyl group. The alkyl group has preferably from 1 to 30 carbon atoms, and more preferably from 1 to 20 carbon atoms. The number of carbon atoms in the alkyl moiety of the substituted alkyl group is preferably from 1 to 30, and more preferably from 1 to 20. Further, the alkyl group may be either a substituted alkyl group or an unsubstituted alkyl group. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a cyclopentyl group, a neopentyl group, an isopropyl group, and an isobutyl group.

Examples of a substituent of the substituted alkyl group include a carboxy group, a sulfo group, a cyano group, a halogen atom (for example, a fluorine atom, a chlorine atom, or a bromine atom), a hydroxy group, an alkoxycarbonyl group having 30 or less carbon atoms (for example, a methoxycarbonyl group, an ethoxycarbonyl group, or a benzyloxycarbonyl group), an alkylsulfonylaminocarbonyl group having 30 or less carbon atoms, an arylsulfonylaminocarbonyl group, an alkylsulfonyl group, an arylsulfonyl group, an acylaminosulfonyl group having 30 or less carbon atoms, an alkoxy group having 30 or less carbon atoms (for example, a methoxy group, an ethoxy group, a benzyloxy group, a phenoxyethoxy group, or a phenethyloxy group), an alkylthio group having 30 or less carbon atoms (for example, a methylthio group, an ethylthio group, or a methylthioethylthioethyl group), an aryloxy group having 30 or less carbon atoms (for example, a phenoxy group, a p-tolyloxy group, a 1-naphthoxy group, or a 2-naphthoxy group), a nitro group, an alkyl group having 30 or less carbon atoms, an alkoxycarbonyloxy group, an aryloxycarbonyloxy group, an acyloxy group having 30 or less carbon atoms (for example, an acetyloxy group or a propionyloxy group), an acyl group having 30 or less carbon atoms (for example, an acetyl group, a propionyl group, or a benzoyl group), a carbamoyl group (for example, a carbamoyl group, an N,N-dimethylcarbamoyl group, a morpholinocarbonyl group, or a piperidinocarbonyl group), a sulfamoyl group (for example, a sulfamoyl group, an N,N-dimethylsulfamoyl group, a morpholinosulfonyl group, or a piperidinosulfonyl group), an aryl group having 30 or less carbon atoms (for example, a phenyl group, a 4-chlorophenyl group, a 4-methylphenyl group, or an a-naphthyl group), an amino group, a substituted amino group (for example, an alkylamino group, a dialkylamino group, an arylamino group, a diarylamino group, or an acylamino group), a substituted ureido group, a substituted phosphono group, and a heterocyclic group. Herein, the carboxy group, the sulfo group, the hydroxy group, and the phosphono group may form a salt with a counter ion.

The alkenyl group may be a straight-chain, branched, or cyclic alkenyl group. The alkenyl group has preferably from 2 to 30 carbon atoms, and more preferably from 2 to 20 carbon atoms. Further, the alkenyl group may be either a substituted alkenyl group or an unsubstituted alkenyl group. The number of carbon atoms in the alkenyl moiety of the substituted alkenyl group is preferably from 2 to 30, and more preferably from 2 to 20. Examples of a substituent of the substituted alkenyl group include those described as examples of the substituents of the substituted alkyl group described above.

The alkynyl group may be a straight-chain, branched, or cyclic alkynyl group. The alkynyl group has preferably from 2 to 30 carbon atoms, and more preferably from 2 to 20 carbon atoms. Further, the alkynyl group may be either a substituted alkynyl group or an unsubstituted alkynyl group. The number of carbon atoms in the alkynyl moiety of the substituted alkynyl group is preferably from 2 to 30, and more preferably from 2 to 20. Examples of a substituent of the substituted alkynyl group include those described as examples of the substituent of the substituted alkyl group described above.

The aralkyl group may be a straight-chain, branched, or cyclic aralkyl group. The aralkyl group has preferably from 7 to 35 carbon atoms, and more preferably from 7 to 25 carbon atoms. Further, the aralkyl group may be either a substituted aralkyl group or an unsubstituted aralkyl group. The number of carbon atoms in the aralkyl moiety of the substituted aralkyl group is preferably from 7 to 35, and more preferably from 7 to 25. Examples of a substituent of the substituted aralkyl group include those described as examples of the substituents of the substituted alkyl group described above.

Examples of the aromatic group represented by $R^{5D}$, $R^{6D}$, or $R^{7D}$ above include an aryl group and a substituted aryl group. The aryl group has preferably from 6 to 30 carbon atoms, and more preferably from 6 to 20 carbon atoms. The number of carbon atoms in the aryl moiety of the substituted aryl group is preferably from 6 to 30, and more preferably from 6 to 20. Examples of the aryl group include a phenyl group, an α-naphthyl group, and a β-naphthyl group. Examples of a substituent of the substituted aryl group include those described as examples of the substituent of the substituted alkyl group described above.

The aliphatic oxy group represented by $R^{5D}$ or $R^{6D}$ above is preferably an alkoxy group having from 1 to 30 carbon atoms. Specific examples thereof include a methoxy group, an ethoxy group, a butoxy group, an octyloxy group, and a phenoxyethoxy group. However, the invention is not limited to these examples.

The aromatic oxy group represented by $R^{5D}$ or $R^{6D}$ above is preferably an aryloxy group having from 6 to 30 carbon atoms. Specific examples thereof include a phenoxy group, a methylphenyloxy group, a chlorophenyloxy group, a methoxyphenyloxy group, and an octyloxyphenyloxy group. However, the invention is not limited to these examples.

The heterocyclic group represented by $R^{5D}$, $R^{6D}$, or $R^{7D}$ above is preferably a heterocyclic group containing a nitrogen atom, an oxygen atom, or a sulfur atom. Specific examples thereof include a pyridyl group, a furyl group, a thienyl group, an imidazolyl group, and a pyrrolyl group.

Formula (7)

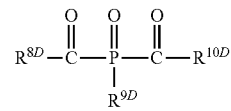

(7)

In Formula (7) above, $R^{8D}$ and $R^{10D}$ each independently represent an alkyl group, an aryl group, or a heterocyclic group; and $R^{9D}$ represents an alkyl group, an aryl group, an alkoxy group, an aryloxy group, or a heterocyclic group. The alkyl group, aryl group, heterocyclic group, alkoxy group, and aryloxy group represented by $R^{8D}$, $R^{9D}$, and $R^{10D}$ each may be unsubstituted or may have a substituent. Examples of the substituent, in the case of having a substituent, include those described as examples of the substituents in Formula (6) described above.

The alkyl group, aryl group, heterocyclic group, alkoxy group, and aryloxy group in Formula (7) each have the same definitions as those in the above Formula (6), respectively.

Among the acylphosphine oxide compounds described above, for example, [2,4,6-trimethylbenzoyl-diphenyl-phosphine oxide] is commercially available under the trade name of DAROCUR TPO (manufactured by BASF), and [bis(2,4,6-trimethylbenzoyl)-phenylphosphine oxide] is commercially available under the trade name of IRGACURE 819 (manufactured by BASF).

Further, water-soluble acylphosphine oxide compounds may be preferably used as the polymerization initiators. The acylphosphine oxide compounds preferably dissolve in distilled water under the condition of 25° C. at a proportion of 0.5% by mass or more, more preferably 1% by mass or more, and particularly preferably 3% by mass or more.

Specific examples of the water-soluble acylphosphine oxide compounds include the compounds described in JP-A No. 2005-307199 (for example, the exemplary compounds 5, 6, and 7). Specific examples of the water-soluble acylphosphine oxide compounds (exemplary compounds 1-1 to 1-3) are shown below. However, it should be construed that the invention is not limited thereto.

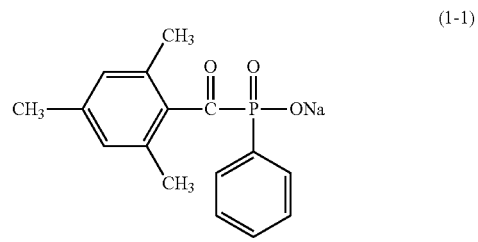

(1-1)

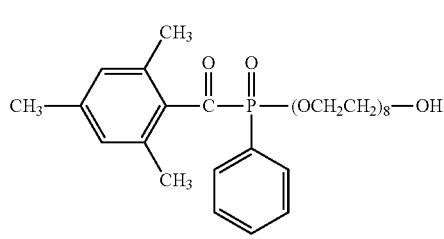

(1-2)

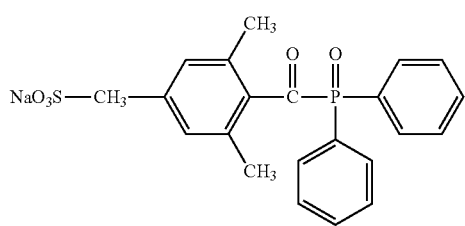

(1-3)

Among the compounds described above, it is preferable to use an acylphosphine oxide compound as a polymerization initiator.

A polymerization initiator other than the above-described polymerization initiators may be also used within a range that does not decrease the effect of the present invention. Further, a polymerization initiator other than the above-described polymerizatior initiator may be used in combination with the acylphosphine oxide compound. In this case, a water-soluble polymerization initiator is preferably used as the polymerization initiator used in combination with the acylphosphine oxide compound. With respect to the degree of "water-solublility", the polymerization initiator is preferably dissolve in distilled water under the condition of 25° C. at a proportion of 0.5% by mass or more, more preferably 1% by mass or more, and particularly preferably 3% by mass or more, as described above.

Examples of the other polymerization initiator described above, which can be used, include camphorquinone, benzophenone, benzophenone derivatives, acetophenone, acetophenone derivatives, for example, α-hydroxycycloalkyl phenyl ketones, 2-hydroxy-2-methyl-1-phenyl-propanone, and dialkoxyacetophenones, α-hydroxy- or 4-aroyl-1,3-dioxolanes, benzoin alkyl ethers, benzyl ketals, for example, benzyl dimethyl ketal, phenyl glyoxalate and derivatives thereof, dimer phenyl glyoxalate, peresters, for example, benzophenonetetracarboxylic acid peresters (for example, those described in EP No. 1,126,541), halomethyltriazines, for example, 2-[2-(4-methoxyphenyl)vinyl]-4,6-bis-trichloromethyl[1,3,5]triazine, 2-(4-methoxyphenyl)-4,6-bis-trichloromethyl[1,3,5]triazine, 2-(3,4-dimethoxyphenyl)-4,6-bis-trichloromethyl[1,3,5]triazine, and 2-methyl-4,6-bis-trichloromethyl[1,3,5]triazine, a hexaarylbisimidazole/co-initiator system, for example, a combination of ortho-chlorohexaphenyl-bisimidazole and 2-mercaptobenzothiazole; ferrocenium compounds or titanocenes, for example, dicyclopentadienyl-bis(2,6-difluoro-3-pyrrolo-phenyl)titanium; and, for example, a mixture with an O-acyloxime ester compound described in GB No. 2,339,571. As the co-initiator, a boric aid compound may be used.

The content of the polymerization initiator in the ink composition is preferably in a range of from 0.01 parts by mass to 35 parts by mass, more preferably from 0.1 parts by mass to 30 parts by mass, and even more preferably from 0.5 parts by mass to 30 parts by mass, with respect to 100 parts by mass of the polymerizable compound described above. Note that, the content of the polymerization initiator means the total amount of used polymerization initiator(s).

The aqueous ink composition in the present invention may include other additives as necessary, other than the components described above. As the other additives, additives which may be used for known pigment dispersions or aqueous ink compositions may be used.

Examples of the other additives include known additives such as a color fading inhibitor, an emulsification stabilizer, a permeation accelerator, an ultraviolet absorbent, an antiseptic, a mildew proofing agent, a pH adjusting agent, a surface tension adjusting agent, an antifoaming agent, a viscosity adjusting agent, a dispersant, a dispersion stabilizer, an anti-rust agent, a chelating agent, an antioxidant, and a solid wetting agent. These various additives may be added during the preparation of the aqueous ink composition, or may be added after the preparation of the aqueous ink composition.

Examples of the ultraviolet absorbent include a benzophenone ultraviolet absorbent, a benzotriazole ultraviolet absorbent, a salicylate ultraviolet absorbent, a cyanoacrylate ultraviolet absorbent, and a nickel complex salt ultraviolet absorbent.

As the color fading inhibitor, various organic color fading inhibitors and metal complex color fading inhibitors can be used. Examples of the organic color fading inhibitors include hydroquinones, alkoxyphenols, dialkoxyphenols, phenols, anilines, amines, indanes, chromanes, alkoxyanilines, and heterocycles. Examples of the metal complex color fading inhibitors include nickel complexes and zinc complexes.

Examples of the mildew proofing agent include sodium dehydroacetate, sodium benzoate, pyridinethiol 1-oxide sodium salt, ethyl p-hydroxybenzoate, 1,2-benzisothiazolin-3-one, sodium sorbate, and pentachlorophenol sodium salt. The amount of the mildew proofing agent to be used in the ink is preferably from 0.02% by mass to 1.00% by mass.

Examples of the anti-rust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include a phenol antioxidant (including a hindered phenol antioxidant), an amine antioxidant, a sulfur antioxidant, and a phosphorus antioxidant.

examples of the chelating agent include ethylenediaminetetraacetic acid sodium salt, nitrilotriacetic acid sodium salt, hydroxyethylethylenediaminetriacetic acid sodium salt, diethylenetriaminepentaacetic acid sodium salt, and uramil-diacetic acid sodium salt.

Examples of the surface tension adjusting agent include a nonionic surfactant, a cationic surfactant, an anionic surfactant, and a betaine surfactant. In order to eject the ink composition satisfactorily by means of an ink jet system, the addition amount of the surface tension adjusting agent is preferably an addition amount that adjusts the surface tension of the ink composition to a range of from 20 mN/m to 60 mN/m, more preferably an addition amount that adjusts the surface tension of the ink composition to a range of from 20 mN/m to 45 mN/m, and even more preferably an addition amount that adjusts the surface tension of the ink composition to a range of 25 mN/m to 40 mN/m.

Specifically, the other additives and the like described in paragraphs [0153] to [0162] of JP-A No. 2007-100071 are described.

Examples of the solid wetting agent may include sugars such as glucose, mannose, fructose, ribose, xylose, arabinose, galactose, aldonic acid, glucitol, maltose, cellobiose, lactose, sucrose, trehalose, and maltotriose; sugar alcohols; hyaluronic acids; and ureas.

The additives may be added directly after the preparation of the aqueous ink composition, or may be added during the preparation of the aqueous ink composition.

[Treatment Liquid]

The ink set of the present invention includes at least one treatment liquid containing at least one acidic compound that aggregates one or more components of the aqueous ink composition.

When the acidic compound included in the treatment liquid and the aqueous ink composition are in contact with each other, the acidic compound accelerates the aggregation of the pigment that has been stably dispersed in the aqueous ink composition, and thus, an image in which bleeding is suppressed and which has excellent rub resistance can be formed.

As the acidic compound, an organic acid or an inorganic acid may be employed, but from the viewpoint of aggregation property, an organic acid is preferable.

Preferable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives of these compounds, and salts thereof.

Above all, an acidic compound having high solubility in water is preferable. Further, from the viewpoint of fixing the whole ink by reacting with the ink composition, an acidic compound having a valency of three or less is preferable, and an acidic compound having a valency of two or three is particularly preferable.

The acidic compounds may be used alone, or may be used in a combination of two or more of them.

The content of the acidic compound in the treatment liquid is preferably from 1% by mass to 20% by mass, more preferably from 5% by mass to 20% by mass, and even more preferably from 10% by mass to 20% by mass.

The pH (at 25° C.) of the treatment liquid in the present invention is preferably from 0.1 to 6.0, more preferably from 0.5 to 5.0, and even more preferably from 0.8 to 4.0. In this case, the pH (at 25° C.) of the aqueous ink composition is preferably 7.5 or higher (and more preferably 8 or higher).

In the present invention, the case where the pH (at 25° C.) of the aqueous ink composition is 7.5 or higher and the pH (at 25° C.) of the treatment liquid is 4 or lower is preferable, from the viewpoints of image density, definition, and speed up of ink jet recording.

The treatment liquid according to the present invention contains at least one acidic compound as an aggregating component that can aggregate components of the aqueous ink composition, and may further contain, as necessary, other aggregating components. Examples of the other aggregating component may include compounds polyvalent metal salts, and cationic compounds.

<Image Forming Method>

In the image forming method of the present invention, the ink set of the present invention described above is used, and the method includes supplying the treatment liquid included in the ink set onto the recording medium (treatment liquid supplying process), and supplying the aqueous ink composition included in the ink set onto the recording medium by an ink-jet method (ink supplying process), whereby the aqueous ink composition and the treatment liquid are brought into contact, to form an image on the recording medium. The method with this configuration enables an image having little bleeding and excellent rub resistance to be formed.

The treatment liquid and the aqueous ink composition included in the ink set of the present invention are as described in the paragraphs concerning the ink set described above, and so are the preferable examples.

Further, other components and the like used in the image forming method of the present invention are also as described above.

In the image forming method of the present invention, in the case where an image is formed by bringing two liquids, that is, an aqueous ink composition and a treatment liquid, into contact with each other at the time of recording, when an aqueous ink composition including, as a pigment, pigment particles whose surface is coated with the above-described dispersant according to the present invention is used, adhesion or accumulation of the aggregates, which are formed by bringing the two liquids into contact with each other, on a liquid discharge portion may be suppressed and, and the adhered aggregates may be easily removed. As a result, ink discharge directional failure during ink ejection may be suppressed and occurrence of image defects such as white spots or the like may be suppressed, so that an image with high definition can be recorded. In addition, with regard to the ejection device, the frequency of maintenance operation can be reduced and maintenance property can be enhanced.

In the ink supplying process, the aqueous ink composition is supplied by an ink jet method. A colored image is formed, specifically, by supplying energy, thereby ejecting the aqueous ink composition to a desired recording medium, that is, plain paper, resin-coated paper, paper exclusively used for ink jet recording, which is described in, for example, JP-A Nos. 8-169172, 8-27693, 2-276670, 7-276789, 9-323475, 62-238783, 10-153989, 10-217473, 10-235995, 10-217597, and 10-337947, a film, electrophotographic common paper, fabrics, glass, metal, ceramics, or the like. As the ink-jet recording method preferable for the present invention, a method described in paragraphs 0093 to 0105 of JP-A No. 2003-306623 can be applied.

The ink-jet system is not particularly limited, and may be a known system. Examples thereof include a charge control system in which an ink is ejected by using an electrostatic attraction force; a drop-on-demand system (pressure pulse system) in which a vibration pressure of a piezo element is used; an acoustic ink jet system in which an electric signal is converted into an acoustic beam and an ink is irradiated with the acoustic beam so as to be ejected by using the radiation pressure; and a thermal ink jet (BUBBLE JET (registered trademark)) system in which an ink is heated to form bubbles and the resulting pressure is used. As the ink jet system, the inkjet method described in JP-A No. 54-50036, in which thermal energy is applied to an ink, the ink volume changes drastically, and by using the force caused by this change, the ink is ejected from the nozzle, may be effectively used.

Ink nozzles and the like, which are used for recording by the ink-jet system, are not particularly limited and may be appropriately selected according to the purposes.

It should be noted that the above ink jet method include, in its scope, a system of discharging a number of droplets of an ink having low concentration, which is referred to as photo ink, each at a small volume; a system of improving the image quality by using plural inks which have substantially the same hue but different concentrations; and a system of using colorless and transparent ink.

Examples of the ink jet system include a shuttle system in which a short serial head is used and recording is performed while allowing the serial head to scan in the cross direction of the recording medium, and a line system using a line head in which recording elements are arranged corresponding to the whole region for one side of a recording medium. In the line system, an image can be recorded over the whole surface of the recording medium by allowing the recording medium to scan in the direction being at right angles to the arranging direction of the recording elements, in which a transportation system such as a carriage by which the short head moves for scanning is not necessary. Further, in the line system, since complicated scanning control for the movement of the carriage and the recording medium is not necessary and only the recording medium moves, a higher recording speed can be realized as compared with the shuttle system.

In the treatment liquid supplying process, the treatment liquid may be supplied onto the recording medium before supplying the aqueous ink composition, or after supplying the aqueous ink composition. The treatment liquid may be supplied in accordance with a known method such as a coating method, an ink jet method, or an immersion method. The coating may be performed by a known coating method using a bar coater, an extrusion die coater, an air doctor coater, a blade coater, a rod coater, a knife coater, a squeeze coater, a reverse roll coater, or the like. Details of the ink jet method are as described above.

In the present invention, an embodiment in which the ink supplying process is provided after the treatment liquid is supplied onto the recording medium in the treatment liquid supplying process is preferable. That is, an embodiment in which, before supplying the aqueous ink composition onto the recording medium, the treatment liquid for aggregating the pigment in the aqueous ink composition is supplied in advance, and the aqueous ink composition is supplied so as to be in contact with the acidic compound included in the treatment liquid that has been supplied onto the recording medium, to form an image is preferable. Thereby, ink-jet recording may be speeded up, and even when high speed recording is performed, an image having high density and high definition may be obtained.

The image forming method of the present invention may further include other process, in addition to the ink supplying process of supplying the aqueous ink composition and the treatment liquid supplying process. The other process is not particularly limited, and may be appropriately selected depending on the purposes. Examples of the other process include a process of drying and removing the solvent of the treatment liquid supplied on the recording medium, a process of drying and removing the organic solvent of the aqueous ink composition, a heating and fixing process of melting and fixing the resin particles which may be incorporated in the aqueous ink composition, and a curing and fixing process of curing the aqueous UV curable material which may be incorporated in the aqueous ink composition.

(Heating and Fixing Process)

It is preferable that the image forming method of the present invention further include heating and fixing (heating and fixing process) for melting and fixing the resin particles incorporated in the aqueous ink composition are melted and fixed, when the aqueous ink composition contains resin particles. When the heating and fixing process has been performed, the image on the recording medium is fixed, and the resistance of the image to rubbing can be further enhanced.

The heating method is not particularly limited. Preferable examples thereof may include methods of non-contact drying such as a method of heating using a heat generator, for example, a nichrome wire heater or the like; a method of supplying warm air or hot air; and a method of heating using a halogen lamp, an infrared lamp, or the like. The method of applying heat and pressure is not particularly limited. Preferable examples thereof include methods of performing heating and fixing by contact such as a method of pressing a hot plate to the image-formed surface of the recording medium; and a method of passing the image through a pair of rollers or the like, using a heat and pressure applying apparatus equipped with a pair of heat and pressure applying rollers, a pair of heat and pressure applying belts, or a heat and pressure applying belt disposed on the side of the image-recorded surface of the recording medium and a retaining roller disposed on the opposite side.

The speed of conveyance of the recording medium, when a heat and pressure applying roller or a heat and pressure applying belt is used, is preferably in a range of from 200 mm/sec to 700 mm/sec, more preferably from 300 mm/sec to 650 mm/sec, and even more preferably from 400 mm/sec to 600 mm/sec.

(Curing and Fixing Process)

Further, it is preferable that the image forming method of the present invention further include curing and fixing (curing and fixing process) for curing the aqueous UV curable material incorporated in the aqueous ink composition, when the aqueous ink composition contains an aqueous UV curable material. The fixing process preferably includes a curing process in which the aqueous ink composition, which has been supplied onto the recording medium, is irradiated with actinic radiation. When irradiating with actinic radiation, the polymerizable compound in the aqueous ink composition is polymerized to form a cured pigment-containing film. Accordingly, the rub resistance of the image formed may be further enhanced.

The actinic radiation used in the present invention is not particularly limited as far as the actinic radiation can cause polymerization of the polymerizable compound. Examples thereof include ultraviolet rays and electron beams. Among them, ultraviolet rays are preferable from the viewpoint of versatility.

-Ultraviolet Irradiation Lamp-

As a means for irradiating with ultraviolet rays, a means which is usually used may be used, and particularly, an ultraviolet irradiation lamp is preferably used.

The ultraviolet irradiation lamp is preferably such a mercury lamp that has a mercury vapor pressure of from 1 Pa to 10 Pa while the lamp is lit, a so-called, a low pressure mercury lamp, a high pressure mercury lamp, a mercury lamp on which a fluorescent substance is coated, or the like. The emission spectrum in the ultraviolet region of these mercury lamps is 450 nm or less, and is particularly in a range of from 184 nm to 450 nm, which is suitable for efficiently allowing the polymerizable compound in the black or colored aqueous ink composition to react. Further, in view of providing a power supply box in a printer, since a small size power supply box can be used, the above mercury lamps are preferable. Concerning the mercury lamp, for example, a metal halide lamp, a high pressure mercury lamp, a super-high pressure mercury lamp, a xenon flash lamp, a deep UV lamp, a lamp in which a mercury lamp is exited using a microwave from the outside without using an electrode, and a UV laser are practically used. Since the region of emission spectrum of these lamps includes the above range, these lamps can be fundamentally applied as far as the size of power supply box, input intensity, shape of lamp, and the like are acceptable. A light source is selected in accordance with the sensitivity of the polymerization initiator used.

It is preferable that the needed ultraviolet ray intensity is from 500 mW/cm² to 5,000 mW/cm² in the wavelength region effective for curing. When the irradiation intensity is weak, formation of an image having high quality and durability may not be attained. When the irradiation intensity is too strong, there are cases where the recording medium is damaged, or color fading of a color material occurs.

-Recording Medium-

The image forming method of the present invention is a method for recording an image on a recording medium.

There is no particular limitation on the recording medium, and general printing paper containing cellulose as a main component such as so-called high quality paper, coated paper, or art paper, which is used for general offset printing and the like, may be used as the recording medium. In the image recording by a general ink jet method using an aqueous ink, the general printing paper containing cellulose as a main component absorbs and dries an ink relatively slowly, so that movements of coloring material are easily caused after a droplet is spotted, and image quality is easily deteriorated. However, according to the ink-jet recording method in the present invention, movements of the coloring material are suppressed, and a high-quality image with excellent color density and excellent hue can be recorded.

As the recording medium, a recording medium which is generally commercially available may be used. Examples thereof include high quality paper (A) such as "OK PRINCE HIGH QUALITY" (trade name, manufactured by Oji Paper Co., LTD.), "SHIORAI" (trade name, manufactured by Nippon Paper Industries Co., Ltd.), and "NEW NPI HIGH QUALITY (trade name, manufactured by Nippon Paper Industries Co., Ltd.); fine coated paper such as "OK EVER LITE COAT" (trade name, manufactured by Oji Paper Co., LTD.) and "AURORA S" (trade name, manufactured by Nippon Paper Industries Co., Ltd.); light weight coated paper (A3) such as "OK COAT L" (trade name, manufactured by Oji Paper Co., LTD.) and "AURORA L" (trade name, manufactured by Nippon Paper Industries Co., Ltd.); coated paper (A2, B2) such as "OK TOPCOAT+" (trade name, manufactured by Oji Paper Co., LTD.) and "AURORA COAT" (trade name, manufactured by Nippon Paper Industries Co., Ltd.); and art paper (A1) such as "OK KINFUJI+" (trade name, manufactured by Oji Paper Co., LTD.) and "TOKUBISHI ART" (trade name, manufactured by Mitsubishi Paper Mills, Ltd.). Further, it is also possible to use various papers for photography for use in ink-jet recording.

Example of the image forming method using the ink set of the present invention further include a method in which an intermediate transfer body is used firstly as a recording medium for forming an image. This method includes supplying the aqueous ink composition containing the above-described dispersant, pigment, and aqueous medium according to the present invention onto the intermediate transfer body by an ink-jet method, and supplying the treatment liquid containing the acidic compound that aggregates components of the aqueous ink composition onto the intermediate transfer body, and in this method, the aqueous ink composition and the treatment liquid are brought into contact with each other, so that an image is formed on the intermediate transfer body, and then, the image formed on the intermediate transfer body is transferred to a desired final recording medium.

Also in this case, the method may further include another process such as a drying and removal process, a heating and fixing process, or the like, as is similar to the case described above.

EXAMPLES

Hereinafter, the present invention is specifically described with reference to Examples, but the scope of the present invention is not limited to these Examples. Unless stated otherwise, the "parts" and "%" are based on mass.

[Synthesis of Macromonomer]

(Synthesis of Macromonomer M-1)

A solution prepared by dissolving 40 g of t-butyl methacrylate as a monomer, 3.5 g of 3-mercapto-1-propanol as a chain transfer agent, and 0.2 g of 2,2-azobis(2,4-dimethylvaleronitrile) as an initiator in 120 mL of THF (tetrahydrofuran) was placed in a 300 mL three-necked flask equipped with a stirrer and a condenser tube, and the temperature of the solution was elevated to 65° C. under a nitrogen atmosphere to allow reacting for 7 hours.

The resulting solution was cooled, and then, 70 mg of dibutyl tin(IV) dilaurate and a catalytic amount of hydroquinone were added thereto, and 7.6 g of 2-methacryloyloxyethyl isocyanate was added dropwise. Thereafter, the temperature of the mixture was elevated to 50° C. and the mixture was allowed to react for 5 hours, and then, the reaction product was purified by performing reprecipitation using a mixed solvent of methanol and water. In this way, 26.8 g of macromonomer M-1 was obtained. The weight average molecular weight (Mw) of the obtained macromonomer M-1 was 3,200, and the molecular weight distribution (Mw/Mn) was 1.95.

(Synthesis of Macromonomers M-2 to M-9c)

Macromonomers M-2 to M-9c were each synthesized in a manner substantially similar to that in the synthesis of the above macromonomer M-1, except that the monomers described in Table 1 were used as the monomer instead of using t-butyl methacrylate, the usage amount of each monomer was appropriately changed to obtain the monomer constituent ratio described in Table 1, and the chain transfer agent described in Table 1 was used instead of using the chain transfer agent in the synthesis of macromonomer M-1. The weight average molecular weight and the molecular weight distribution are shown in Table 1.

TABLE 1

| Macro-monomer | Monomer | Constituent ratio (%) | Chain Transfer Agent | Molecular Weight (×10³) | Molecular Weight Distribution | Note |
|---|---|---|---|---|---|---|
| M-1 | t-Butyl methacrylate | 100 | 3-Mercaptopropanol | 3.2 | 1.95 | Invention |
| M-2 | t-Butyl acrylalte | 60 | Mercaptododecanol | 10.5 | 2.2 | Invention |
|  | Methyl methacrylate | 40 |  |  |  |  |
| M-3 | t-Butyl methacrylate | 10 | 3-Mercaptopropanol | 1.2 | 3.87 | Invention |
|  | Butyl methacrylate | 70 |  |  |  |  |
|  | Benzyl methacrylate | 20 |  |  |  |  |
| M-4 | t-Butyl methacrylate | 80 | 3-Mercaptopropanol | 5.6 | 1.86 | Invention |
|  | p-Styrenesulfonic acid | 20 |  |  |  |  |

TABLE 1-continued

| Macro-monomer | Monomer | Constituent ratio (%) | Chain Transfer Agent | Molecular Weight (×10³) | Molecular Weight Distribution | Note |
|---|---|---|---|---|---|---|
| M-5 | t-Butyl methacrylate | 20 | Mercaptododecanol | 0.8 | 1.91 | Invention |
|  | Hydroxyethyl methacrylate | 80 |  |  |  |  |
| M-6 | Maleic acid | 40 | Mercaptoethanol | 15.6 | 2.62 | Invention |
|  | Styrene | 60 |  |  |  |  |
| M-7 | t-Butyl methacrylate | 50 | Mercaptododecanol | 2.2 | 2.22 | Invention |
|  | Dimethylacrylamide | 50 |  |  |  |  |
| M-8 | Vinylphosphonic acid | 60 | Mercaptoethanol | 1.9 | 4.02 | Invention |
|  | Methyl methacrylate | 40 |  |  |  |  |
| M-9c | Methyl methacrylate | 100 | Mercaptoethanol | 0.6 | 1.4 | Comparative |

[Synthesis of Dispersant]
(Synthesis of Graft Polymer P-1)

20 g of methyl ethyl ketone was placed in a 300 mL three-necked flask equipped with a stirrer and a condenser tube, and was heated to 75° C. under a nitrogen atmosphere. Into the flask, a solution prepared by dissolving 1.16 g of dimethyl 2,2'-azobisisobutyrate, 15 g of macromonomer M-1 obtained as described above, and 45 g of methyl methacrylate in 40 g of methyl ethyl ketone was added dropwise over a period of 3 hours. After the completion of the addition, the reaction was continued for an additional one hour. Then, a solution prepared by dissolving 0.2 g of dimethyl 2,2'-azobisisobutyrate in 0.6 g of methyl ethyl ketone was added thereto, the temperature of the mixture was elevated to 80° C., and stirring was continued for 4 hours while heating to allow all the monomers to react. Disappearance of monomers was confirmed by $^1$H-NMR. 17.5 g of trifluoroacetic acid was added to the resulting reaction solution to allow reacting for 5 hours at 40° C. Then, reprecipitation was performed using hexane. In this way, 59 g of graft polymer P-1 was obtained.

(Synthesis of Graft Polymers P-2 to P-17)

Graft polymers P-2 to P-17 were each synthesized in a manner substantially similar to that in the synthesis of graft polymer P-1, except that macromonomer M-1 and methyl methacrylate in the synthesis of graft polymer P-1 were replaced by the monomers described in Table 2, and the usage amount of each monomer was appropriately changed to obtain the monomer constituent ratio described in Table 2. The weight average molecular weight and the molecular weight distribution are shown in Table 2.

Note that, in Table 2, PE 200 (trade name) is polyethylene glycol monomethacrylate manufactured by NOF Corporation.

TABLE 2

| Dispersant No. | Monomer | Constituent ratio (%) | Weight Average Molecular Weight (Mw) (×10³) | Molecular Weight Distribution | Note |
|---|---|---|---|---|---|
| P-1 | M-1 | 25 | 42.2 | 2.81 | Invention |
|  | Methyl methacrylate | 75 |  |  |  |
| P-2 | M-1 | 10 | 65.1 | 3.34 | Invention |
|  | A-4 | 90 |  |  |  |
| P-3 | M-2 | 40 | 45.9 | 2.01 | Invention |
|  | A-15 | 60 |  |  |  |
| P-4 | M-1 | 11 | 35.9 | 1.98 | Invention |
|  | A-4 | 50 |  |  |  |
|  | Methyl methacrylate | 39 |  |  |  |
| P-5 | M-1 | 20 | 190.2 | 4.53 | Invention |
|  | A-2 | 15 |  |  |  |
|  | Butyl Acrylate | 65 |  |  |  |
| P-6 | M-2 | 30 | 25.5 | 3.31 | Invention |
|  | A-8 | 5 |  |  |  |
|  | 2-Ethylhexyl methacrylate | 65 |  |  |  |
| P-7 | M-2 | 8 | 22.2 | 2.95 | Invention |
|  | A-9 | 12 |  |  |  |
|  | Hydroxyethyl acrylate | 80 |  |  |  |
| P-8 | M-8 | 25 | 10.6 | 2.64 | Invention |
|  | A-6 | 15 |  |  |  |
|  | PE-200 | 60 |  |  |  |
| P-9 | M-1 | 10 | 40.3 | 2.02 | Invention |
|  | A-15 | 15 |  |  |  |
|  | Ethyl methacrylate | 75 |  |  |  |
| P-10 | M-1 | 25 | 350.3 | 3.3 | Invention |
|  | A-19 | 60 |  |  |  |
|  | Dimethylacrylamide | 15 |  |  |  |

TABLE 2-continued

| Dispersant No. | Monomer Constituent ratio (%) | | Weight Average Molecular Weight (Mw) (×10³) | Molecular Weight Distribution | Note |
|---|---|---|---|---|---|
| P-11 | M-1 | 10 | 40.1 | 2.54 | Invention |
|  | A-15 | 15 |  |  |  |
|  | Cyclohexyl methacrylate | 75 |  |  |  |
| P-12 | M-2 | 3 | 70.6 | 1.86 | Invention |
|  | A-18 | 45 |  |  |  |
|  | Vinylcarbazole | 52 |  |  |  |
| P-13 | M-8 | 40 | 21.3 | 1.78 | Invention |
|  | Styrene | 60 |  |  |  |
| P-14 | Polyethylene glycol methacrylate | 25 | 50.2 | 3.77 | Comparative |
|  | Methyl methacrylate | 75 |  |  |  |
| P-15 | Stearyl methacrylate | 25 | 10.4 | 2.22 | Comparative |
|  | A-1 | 15 |  |  |  |
|  | Acrylic acid | 60 |  |  |  |
| P-16 | Methacrylic acid | 30 | 39.5 | 1.99 | Comparative |
|  | Ethyl methacrylate | 70 |  |  |  |
| P-17 | M-9c | 30 | 48.2 | 2.94 | Comparative |
|  | Styrene | 40 |  |  |  |
|  | Butyl acrylate | 20 |  |  |  |
|  | Ethylene glycol monoacrylate | 10 |  |  |  |

Example 1

Ink set S-1 including aqueous ink composition J-1 and treatment liquid 1 was obtained as follows.

[Preparation of Aqueous Ink Composition]

(Preparation of Pigment Dispersion D-1)

10 parts of Pigment Blue 15:3 (PB 15:3; trade name: PHTHALOCYANINE BLUE A220, manufactured by Dainichiseika Color & Chemicals Mfg. Co., Ltd.), 5 parts of P-1 obtained as described above, 42 parts of methyl ethyl ketone, 5.5 parts of a 1 mol/L aqueous solution of sodium hydroxide, and 87.2 parts of ion exchanged water were mixed, and the resulting mixture was subjected to dispersion for a period of from 2 hours to 6 hours using a bead mill with zirconia beads having a diameter of 0.1 mm.

From the resulting dispersion, methyl ethyl ketone was removed under reduced pressure at 55° C., and further a part of water was removed, to obtain a pigment-containing resin particle dispersion having a pigment concentration of 10.2% by mass. The dispersion was further subjected to centrifugal separation using a centrifugal machine (trade name: 05P-21, manufactured by Hitachi, Ltd.) at 5,000 rpm for 30 minutes. Then, ion exchanged water was added thereto so that the pigment concentration became 5% by mass. The resulting dispersion was subjected to pressure filtration using a membrane filter having a pore size of 2.5 μm (manufactured by Advantec Toyo Kaisha, Ltd.). Thereafter, ion exchanged water was added thereto so that the pigment concentration became 4% by mass. In this way, pigment dispersion D-1 was obtained.

Aqueous ink composition J-1 was prepared using pigment dispersion D-1 obtained as described above. The respective components described below were mixed to obtain the following ink composition and then, the mixture was subjected to centrifugal separation processing (at 10,000 rpm to 20,000 rpm, for a period of from 30 minutes to 2 hours) to obtain aqueous ink composition J-1.

| Ink Composition | |
|---|---|
| Pigment dispersion D-1 | 40 parts |
| Glycerin | 7 parts |
| Diethylene glycol | 9 parts |
| Triethanolamine | 1 part |
| OLFINE E1010 (trade name, manufactured by Nissin Chemical Industry Co., Ltd.) | 1 part |
| Triethylene glycol monobutyl ether | 9 parts |
| Ion exchanged water | 34 parts |

The pH of the aqueous ink composition measured by using a pH meter WM-50EG (trade name, manufactured by DKK-TOA Corporation) was 8.6.

[Preparation of Treatment Liquid 1]

Treatment liquid 1 was prepared by mixing the respective components described below to give the following composition. The physical property values of treatment liquid 1 were measured, and treatment liquid 1 was found to have viscosity of 2.6 mPa·s, a surface tension of 37.3 N/m, and pH of 1.6 (at 25° C.).

| Composition of Treatment Liquid 1 | |
|---|---|
| Maleic acid (a divalent carboxylic acid; manufactured by Wako Pure Chemical Industries, Ltd.) | 15.0% |
| Diethylene glycol monomethyl ether (manufactured by Wako Pure Chemical Industries, Ltd.) | 20.0% |
| N-Oleoyl-N-methyltaurine sodium salt (surfactant) | 1.0% |
| Ion exchanged water | 64.0% |

Aqueous ink compositions J-2 to J-28 were each prepared in a manner substantially similar to that in the preparation of aqueous ink composition J-1 described above, except that pigment dispersions D-2 to D-28 described below were used, respectively, instead of using pigment dispersion D-1 in the preparation of aqueous ink composition J-1.

The obtained aqueous ink compositions J-1 to J-28 were each paired with treatment liquid 1, whereby ink sets S-1 to S-28 were respectively obtained.

(Preparation of Pigment Dispersions D-2 to D-28)

Pigment dispersions D-2 to D-28 were each prepared in a manner substantially similar to that in the preparation of pigment dispersion D-1, except that the resin dispersant and pigment shown in Table 3 were used instead of using dispersant P-1 and PB 15:3 in the preparation of pigment dispersion D-1.

Details concerning the pigments described in Table 3 are as follows.

C.I. Pigment Red 122 (PR 122; trade name: CROMOPHTAL JET MAGENTA DMQ, manufactured by Ciba)

C.I. Pigment Yellow 74 (PY 74; trade name: IRGALITE YELLOW GS, manufactured by Ciba)

Carbon black (CB; trade name: NIPEX 180-IQ, manufactured by Degussa)

Comparative Example 1

Aqueous ink compositions J-29 to J-36 were each prepared in a manner substantially similar to that in the preparation of the aqueous ink composition J-1 in Example 1, except that pigment dispersions D-29 to D-36 described below were used, respectively, instead of using pigment dispersion D-1 in the preparation of aqueous ink composition J-1 in Example 1. The obtained aqueous ink compositions J-29 to J-36 were each paired with the above treatment liquid 1 to obtain ink sets S-29 to S-36, respectively.

(Preparation of Pigment Dispersions D-29 to D-36)

Pigment dispersions D-29 to D-36 were each prepared in a manner substantially similar to that in the preparation of pigment dispersion D-1 in Example 1, except that the resin dispersant and pigment shown in Table 3 were used instead of using dispersant P-1 and PB 15:3 in the preparation of pigment dispersion D-1 in Example 1.

Comparative Example 2

Treatment liquid 2 was prepared as follows, and the obtained treatment liquid 2 was paired with the aqueous ink composition shown in Table 3 to obtain ink sets S-37 to S-40.

[Preparation of Treatment Liquid 2]

Treatment liquid 2 was prepared by mixing the respective components described below to give the following composition. The physical property values of treatment liquid 2 were measured, and treatment liquid 2 was found to have pH of 6.5 (at 25° C.).

| Composition of Treatment Liquid 2 | |
|---|---|
| Magnesium nitrate hexahydrate (polyvalent metal salt) | 10% |
| Glycerin | 5% |
| Diethylene glycol | 5% |
| Isopropyl alcohol | 5% |
| ACETYLENOL EH (trade name, manufactured by Kawaken Fine Chemicals Co., Ltd.) | 0.2% |
| Ion exchanged water | 74.8% |

Example 2

UV curable type aqueous ink composition J-37 was prepared as follows, and the obtained aqueous ink composition was paired with the above-described treatment liquid 1 to obtain ink set S-41.

[Preparation of Aqueous Ink Composition J-37]

Aqueous ink composition J-37 was obtained by using pigment dispersion D-1 obtained as described above. The respective components described below were mixed to obtain the following ink composition and then, the mixture was subjected to centrifugal separation processing (at 10,000 rpm to 20,000 rpm, for a period of from 30 minutes to 2 hours) to obtain ink composition J-37.

| Ink Composition | |
|---|---|
| Pigment dispersion D-1 | 40 parts |
| Exemplary compound 1-1 (polymerization initiator) | 3 parts |
| Exemplary compound 2-1 (polymerizable compound) | 5 parts |
| Hydroxyethyl methacrylate (polymerizable compound) | 15 parts |
| Glycerin | 7 parts |
| Diethylene glycol | 9 parts |
| Triethanolamine | 1 part |
| OLFINE E1010 (trade name, manufactured by Nissin Chemical Industry Co., Ltd.) | 1 part |
| Triethylene glycol monobutyl ether | 9 parts |
| Ion exchanged water | 10 parts |

The pH of the obtained aqueous ink composition J-37 measured using a pH meter WM-50EG (trade name, manufactured by DKK-TOA Corporation) was 8.6.

Aqueous ink compositions J-38 to J-64 were each prepared in a manner substantially similar to that in the preparation of aqueous ink composition J-37 described above, except that pigment dispersions D-2 to D-28 described above were used, respectively, instead of using pigment dispersion D-1 in the preparation of aqueous ink composition J-37.

The obtained aqueous ink compositions J-37 to J-64 were each paired with treatment liquid 1, whereby ink sets S-41 to S-68 were obtained.

Comparative Example 3

Aqueous ink compositions J-65 and J-66 were each prepared in a manner substantially similar to that in the preparation of aqueous ink composition J-37 described above, except that pigment dispersions D-37 and D-30 were used, respectively, instead of using pigment dispersion D-1 in the preparation of aqueous ink composition J-37.

The obtained aqueous ink compositions J-65 to J-66 were each paired with treatment liquid 1, whereby, ink sets S-69 and S-70 were obtained.

(Preparation of Pigment Dispersions D-37)

Pigment dispersion D-37 was prepared in a manner substantially similar to that in the preparation of pigment dispersion D-1, except that dispersant P-17 was used instead of dispersant P-1 used in the preparation of pigment dispersion D-1.

Comparative Example 4

The above treatment liquid 2 was paired with aqueous ink composition J-45 shown in Table 4 to obtain ink set S-71.

<Evaluation>

[Evaluation of Pigment Dispersion]

(1) Particle Diameter

The volume average particle diameter of each of the pigment dispersions obtained as described above was measured using a NANOTRAC particle size distribution analyzer UPA-EX150 (trade name, manufactured by Nikkiso Co., Ltd.) by a dynamic light scattering method under the following measurement conditions. Evaluation was made according to the following criteria. Results are shown in Table 3 and Table 4.

Measurement conditions: 10 mL of ion exchanged water is added to 10 μL of the dispersion to prepare a solution for measurement. The measurement is performed at 25° C.

-Evaluation Criteria-

A: The average particle diameter is 70 nm or more but less than 100 nm.

B: The average particle diameter is 100 nm or more but less than 130 nm.

C: The average particle diameter is 130 nm or more but less than 200 nm.

D: The average particle diameter is 200 nm or more.

(2) Stability Over Time

The particle dispersions obtained as described above were each left to stand in a sealed state at 65° C. for 20 days. Thereafter, the particle diameter and viscosity of the pigment dispersion were measured. The changes in particle diameter and viscosity before and after standing still were evaluated according to the following criteria.

-Evaluation Criteria-

A: Changes in average particle diameter and viscosity are not detected at all.

B: Changes in average particle diameter and viscosity are not detected.

C: Changes in average particle diameter and viscosity are slightly detected, which is not practically problematic.

D: Changes in average particle diameter and viscosity are detected, which is practically problematic.

The particle diameter was measured in substantially the same manner as in the above (1). The viscosity was measured at 25° C. using TV-22 TYPE VISCOMETER (trade name, manufactured by Toki Sangyo Co., Ltd.).

[Evaluation of Aqueous Ink Composition]

Evaluation of the aqueous ink composition was performed using an ink-jet recording apparatus equipped with a prototype print head with 600 dpi and 256 nozzles as the ink jet recording apparatus and using aqueous inks (J-1) to (J-66) as the aqueous ink composition for ink-jet recording.

(1) Ejection Stability

Upon printing a solid image using the ink-jet recording apparatus described above, the printed matter was observed to determine the frequency of the occurrence of flight deviation of ink (phenomenon in which the ejected ink droplet reaches a deviated position of the receiving material) and mist, during the period from the initiation of the printing to the completion of the printing. Evaluation was made according to the following criteria.

-Evaluation Criteria-

A: Flight deviation of ink and mist hardly occur.

B: Flight deviation of ink and mist occur, but the frequency is low to the extent not being practically problematic.

C: Flight deviation of ink and mist are not frequently observed, but the frequency of the occurrence is higher as compared with that evaluated to give the above evaluation B, and there is a possibility to be problematic when a high image quality is required.

D: Flight deviation of ink and mist frequently occur, which is practically problematic.

(2) Ejection Recoverability

After printing a solid image using the ink-jet recording apparatus described above, the ink jet recording apparatus was left for 3 weeks under an environment of 25° C. and 65% RH with the head portion uncovered and being in a state of being exposed in the air. Thereafter, ejection was carried out again, and during the re-ejection, the ejection state was observed. Evaluation was made according to the following criteria.

-Evaluation Criteria-

A: It is possible to eject the ink without performing the predetermined maintenance operation.

B: It is possible to eject the ink again by performing the predetermined maintenance operation once.

C: It is possible to eject the ink again by performing the predetermined maintenance operation twice.

D: It is not possible to eject the ink even though the predetermined maintenance operation is performed for three times.

Note that, the predetermined maintenance operation refers to an operation of removing the clogging of the head by ejecting an ink while applying a pressure of 15 Pa.

(3) Image Quality

With regard to the ink sets S-1 to S-40 obtained as described above, the following evaluation was performed.

A sheet of "OK TOPCOAT+" (trade name, manufactured by Oji Paper Co., LTD.; a recording medium) was fixed on a stage that was movable at a velocity of 500 mm/sec. The treatment liquid (treatment liquid 1 or 2) included in the ink set was coated thereon using a wire bar coater to give a thickness of about 1.2 μm, and immediately after coating, dried at 50° C. for 2 seconds.

After that, a solid image was printed as follows: a print head GELJET GX5000 (trade name, manufactured by Ricoh Co., Ltd.) which was arranged and fixed such that the direction of the print head was inclined (at an angle of 75.5 degree) with respect to the scanning direction was used; and printing was performed by a line system under the conditions of a definition of 1200 dpi×1200 dpi and an ink droplet amount of 2.4 pL. Immediately after printing, the image was dried at 60° C. for 3 seconds.

Subsequently, as a fixing process, the resulting printed recording medium was passed between a pair of fixing rollers heated at 60° C. so that heating and fixing processing was carried out at a nip pressure of 0.25 MPa and a nip width of 4 mm (heating and fixing process). In this manner, a printed sample was obtained.

With regard to the obtained printed sample, the printed state was observed visually or using a magnifying glass. Evaluation was made according to the following evaluation criteria.

-Evaluation Criteria-

A: It is hard to find a white spot portion even when the printed sample is observed using a magnifying glass.

B: It is hard to find a white spot portion when the printed sample is visually observed, but it is possible to find white spot portions by using a magnifying glass.

C: It is possible to find white spot portions when the printed sample is visually observed (without using a magnifying glass).

D: It is easy to perceive white spot portions when the printed sample is visually observed (without using a magnifying glass).

(4) Rub Resistance

With regard to the printed sample obtained as described above, a matter prepared by winding a sheet of "OK TOPCOAT+" (trade name, manufactured by Oji Paper Co., LTD.) around a paper weight (470 g of weight, 15 mm×30 mm×120 mm in size, equivalent to a load of 260 kg/m$^2$) was placed on the printed sample, and rubbed back and forth three times. Stripping in the image was visually observed, and evaluation was made according to the following criteria.

It should be noted that when stripping in the image was not detected in the image after rubbing back and forth three times, the printed sample was further rubbed back and forth, by six times at the maximum.

-Evaluation Criteria-

A: No stripping is detected in the image, even though the printed sample is rubbed back and forth six times.

B: No stripping is visually detected in the image on the printed sample surface when the printed sample is rubbed back and forth four times, however, stripping is detected when the printed sample is rubbed back and forth six times.

C: No stripping is visually detected in the image on the printed sample surface when the printed sample is rubbed back and forth two times, however, stripping is detected when the printed sample is rubbed back and forth four times.

D: Stripping is visually detected in the image on the printed sample surface when the printed sample is rubbed back and forth two times.

(5) Blocking Resistance

The evaluation sample obtained as described above was cut into two sheets with a size of 3.5 cm×4 cm. The two sheets of the evaluation sample were placed on an acrylic plate having a size of 10 cm×10 cm (thickness of 7 mm) such that the printed surfaces faced each other, and further ten sheets of unprinted "TOKUBISHI ART DOUBLE-SIDED N" (trade name, manufactured by Mitsubishi Paper Mills, Ltd.), which had been cut into the same size, were placed in a layered manner on this evaluation sample. Then, another acrylic plate having a size of 10 cm×10 cm (thickness of 7 mm) was further placed thereon, and the assembly was left to stand for 12 hours under an environment of 25° C. and 50% RH.

After standing still, a weight of 1 kg (corresponding to a load of 700 kg/m²) was loaded on the top acrylic plate, and the assembly was further left to stand for 24 hours.

Furthermore, the assembly was stored for 2 hours under an environment of 25° C. and 50% RH. Thereafter, the sheets of unprinted "TOKUBISHI ART" (trade name, unprinted paper) that had been placed on the evaluation sample were peeled off. The ease of peeling in this process, and, after peeling the adhesion of the two sheets of the evaluation sample were visually observed. Evaluation was made according to the following criteria.

-Evaluation Criteria-

A: No adhesion is seen on the printed surface.

B: Adhesion occurs on the printed surface, but adhesion of paper is not observed.

C: Adhesion occurs on the printed surface, and adhesion of paper can be visually observed.

With regard to the ink sets S-41 to S-71 obtained as described above, evaluation of (3) image quality, (4) rub resistance, and (5) blocking resistance was performed in substantially the same manner as those described above, except that the fixing process in the above evaluation of (3) image quality, (4) rub resistance, and (5) blocking resistance was replaced by the following process.

(Curing and Fixing Process)

The printed image was irradiated with ultraviolet rays using a UV lamp so that the exposure amount was 2.5 J/cm², whereby fixing processing was carried out, and a printed sample was obtained.

TABLE 3

| Ink Set | Aqueous Ink Composition | Pigment Dispersion | Dispersant | Pigment | Treatment Liquid | Pigment Dispersion Particle Diameter | Stability Over Time | Aqueous Ink Composition Ejection Stability | Ejection Recoverability | Evaluation of Image Image Quality | Rub Resistance | Blocking Resistance | Note |
|---|---|---|---|---|---|---|---|---|---|---|---|---|---|
| S-1 | J-1 | D-1 | P-1 | PB 15:3 | 1 | C | C | A | A | B | A | A | Invention |
| S-2 | J-2 | D-2 | P-2 | PB 15:3 | 1 | C | A | A | A | A | A | A | Invention |
| S-3 | J-3 | D-3 | P-3 | PB 15:3 | 1 | A | A | B | B | B | A | A | Invention |
| S-4 | J-4 | D-4 | P-4 | PB 15:3 | 1 | A | A | A | A | B | A | A | Invention |
| S-5 | J-5 | D-5 | P-5 | PB 15:3 | 1 | B | B | A | A | B | A | A | Invention |
| S-6 | J-6 | D-6 | P-6 | PB 15:3 | 1 | B | B | A | A | B | A | A | Invention |
| S-7 | J-7 | D-7 | P-7 | PB 15:3 | 1 | A | A | A | A | B | A | A | Invention |
| S-8 | J-8 | D-8 | P-8 | PB 15:3 | 1 | A | A | A | A | B | A | A | Invention |
| S-9 | J-9 | D-9 | P-9 | PB 15:3 | 1 | A | A | A | B | A | A | A | Invention |
| S-10 | J-10 | D-10 | P-10 | PB 15:3 | 1 | A | A | A | C | A | A | A | Invention |
| S-11 | J-11 | D-11 | P-11 | PB 15:3 | 1 | C | C | A | A | B | A | A | Invention |
| S-12 | J-12 | D-12 | P-12 | PB 15:3 | 1 | C | C | A | A | B | A | B | Invention |
| S-13 | J-13 | D-13 | P-13 | PB 15:3 | 1 | C | C | A | A | B | A | A | Invention |
| S-14 | J-14 | D-14 | P-3 | PR 122 | 1 | C | C | A | A | B | A | A | Invention |
| S-15 | J-15 | D-15 | P-4 | PR 122 | 1 | B | B | A | A | B | A | B | Invention |
| S-16 | J-16 | D-16 | P-9 | PR 122 | 1 | B | B | A | A | B | A | A | Invention |
| S-17 | J-17 | D-17 | P-12 | PR 122 | 1 | A | A | A | A | B | A | A | Invention |
| S-18 | J-18 | D-18 | P-13 | PR 122 | 1 | C | C | A | A | A | A | A | Invention |
| S-19 | J-19 | D-19 | P-3 | PY 74 | 1 | A | A | A | B | B | A | A | Invention |
| S-20 | J-20 | D-20 | P-4 | PY 74 | 1 | A | A | A | A | B | A | A | Invention |
| S-21 | J-21 | D-21 | P-9 | PY 74 | 1 | A | C | A | A | B | A | A | Invention |
| S-22 | J-22 | D-22 | P-12 | PY 74 | 1 | B | B | A | A | B | A | A | Invention |
| S-23 | J-23 | D-23 | P-13 | PY 74 | 1 | A | A | C | A | B | A | A | Invention |
| S-24 | J-24 | D-24 | P-3 | CB | 1 | C | C | A | A | A | A | A | Invention |
| S-25 | J-25 | D-25 | P-4 | CB | 1 | A | A | A | A | B | A | A | Invention |
| S-26 | J-26 | D-26 | P-9 | CB | 1 | C | C | A | A | B | A | A | Invention |
| S-27 | J-27 | D-27 | P-12 | CB | 1 | B | B | A | A | B | A | A | Invention |
| S-28 | J-28 | D-28 | P-13 | CB | 1 | A | A | A | A | B | A | A | Invention |
| S-29 | J-29 | D-29 | P-14 | PB 15:3 | 1 | D | C | D | D | D | D | C | Comparative |
| S-30 | J-30 | D-30 | P-15 | PB 15:3 | 1 | C | C | C | C | D | D | C | Comparative |
| S-31 | J-31 | D-31 | P-14 | PR 122 | 1 | D | C | D | D | C | C | C | Comparative |
| S-32 | J-32 | D-32 | P-17 | PR 122 | 1 | D | D | D | D | D | D | C | Comparative |
| S-33 | J-33 | D-33 | P-14 | PY 74 | 1 | D | C | D | D | C | C | C | Comparative |
| S-34 | J-34 | D-34 | P-15 | PY 74 | 1 | C | C | C | C | D | D | C | Comparative |

TABLE 3-continued

| Ink Set | Aqueous Ink Composition | Pigment Dispersion | Dispersant | Pigment | Treatment Liquid | Pigment Dispersion Particle Diameter | Stability Over Time | Aqueous Ink Composition Ejection Stability | Ejection Recoverability | Image Quality | Rub Resistance | Blocking Resistance | Note |
|---|---|---|---|---|---|---|---|---|---|---|---|---|---|
| S-35 | J-35 | D-35 | P-14 | CB | 1 | D | C | D | D | C | C | C | Comparative |
| S-36 | J-36 | D-36 | P-15 | CB | 1 | C | C | C | C | D | D | C | Comparative |
| S-37 | J-9 | D-9 | P-9 | PB 15:3 | 2 | B | B | A | A | D | C | C | Comparative |
| S-38 | J-16 | D-16 | P-9 | PR 122 | 2 | B | B | A | A | C | C | C | Comparative |
| S-39 | J-21 | D-21 | P-9 | PY 74 | 2 | A | C | A | A | C | C | C | Comparative |
| S-40 | J-26 | D-26 | P-9 | CB | 2 | A | A | A | A | C | C | C | Comparative |

TABLE 4

| Ink Set | Aqueous Ink Composition | Pigment Dispersion | Dispersant | Pigment | Treatment Liquid | Pigment Dispersion Particle Diameter | Stability Over Time | Aqueous Ink Composition Ejection Stability | Ejection Recoverability | Image Quality | Rub Resistance | Blocking Resistance | Note |
|---|---|---|---|---|---|---|---|---|---|---|---|---|---|
| S-41 | J-37 | D-1 | P-1 | PB 15:3 | 1 | C | C | A | A | D | A | A | Invention |
| S-42 | J-38 | D-2 | P-2 | PB 15:3 | 1 | C | C | A | A | D | A | A | Invention |
| S-43 | J-39 | D-3 | P-3 | PB 15:3 | 1 | B | B | A | A | B | A | A | Invention |
| S-44 | J-40 | D-4 | P-4 | PB 15:3 | 1 | A | A | A | A | B | A | A | Invention |
| S-45 | J-41 | D-5 | P-5 | PB 15:3 | 1 | B | B | A | A | B | B | A | Invention |
| S-46 | J-42 | D-6 | P-6 | PB 15:3 | 1 | B | B | A | A | B | A | A | Invention |
| S-47 | J-43 | D-7 | P-7 | PB 15:3 | 1 | A | A | A | A | B | A | A | Invention |
| S-48 | J-44 | D-8 | P-8 | PB 15:3 | 1 | A | A | A | A | B | A | A | Invention |
| S-49 | J-45 | D-9 | P-9 | PB 15:3 | 1 | A | A | A | A | A | B | A | Invention |
| S-50 | J-46 | D-10 | P-10 | PB 15:3 | 1 | A | A | A | A | A | A | A | Invention |
| S-51 | J-47 | D-11 | P-11 | PB 15:3 | 1 | C | C | A | A | B | A | A | Invention |
| S-52 | J-48 | D-12 | P-12 | PB 15:3 | 1 | B | B | A | A | B | A | B | Invention |
| S-53 | J-49 | D-13 | P-13 | PB 15:3 | 1 | A | A | A | A | B | A | A | Invention |
| S-54 | J-50 | D-14 | P-3 | PR 122 | 1 | A | A | A | B | A | A | A | Invention |
| S-55 | J-51 | D-15 | P-4 | PR 122 | 1 | B | B | A | A | B | A | B | Invention |
| S-56 | J-52 | D-16 | P-9 | PR 122 | 1 | A | A | A | A | B | A | A | Invention |
| S-57 | J-53 | D-17 | P-12 | PR 122 | 1 | B | B | A | A | B | A | A | Invention |
| S-58 | J-54 | D-18 | P-13 | PR 122 | 1 | A | A | A | A | B | A | A | Invention |
| S-59 | J-55 | D-19 | P-3 | PY 74 | 1 | A | A | A | A | A | A | A | Invention |
| S-60 | J-56 | D-20 | P-4 | PY 74 | 1 | B | B | A | A | B | A | A | Invention |
| S-61 | J-57 | D-21 | P-9 | PY 74 | 1 | A | A | A | A | B | A | A | Invention |
| S-62 | J-58 | D-22 | P-12 | PY 74 | 1 | A | A | A | A | A | A | A | Invention |
| S-63 | J-59 | D-23 | P-13 | PY 74 | 1 | B | B | A | A | B | A | A | Invention |
| S-64 | J-60 | D-24 | P-3 | CB | 1 | A | A | A | A | B | A | A | Invention |
| S-65 | J-61 | D-25 | P-4 | CB | 1 | A | A | A | A | A | A | A | Invention |
| S-66 | J-62 | D-26 | P-9 | CB | 1 | B | B | A | A | B | A | A | Invention |
| S-67 | J-63 | D-27 | P-12 | CB | 1 | A | A | A | A | A | A | A | Invention |
| S-68 | J-64 | D-28 | P-13 | CB | 1 | A | A | A | A | B | A | A | Invention |
| S-69 | J-65 | D-37 | P-17 | PB 15:3 | 1 | D | D | D | D | D | D | C | Comparative |
| S-70 | J-66 | D-30 | P-15 | PB 15:3 | 1 | C | C | C | C | D | D | C | Comparative |
| S-71 | J-45 | D-9 | P-9 | PB 15:3 | 2 | A | A | A | A | C | C | C | Comparative |

It is found from Table 3 and Table 4 that the aqueous ink composition included in the ink set of the present invention had excellent ejection stability and excellent ejection recoverability. Further, it is also found that the image formed by using the ink set of the present invention exhibited excellent results in image quality, rub resistance, and blocking resistance.

According to the present invention, it is possible to provide an ink set that can form an image in which occurrence of bleeding is suppressed and which exhibits excellent rub resistance, and it is also possible to provide an image forming method using the ink.

Exemplary embodiments of the present invention include the following embodiments. However, the invention is not limited to the following exemplar embodiments.

<1> An ink set comprising:
an aqueous ink composition including a pigment, a graft polymer including an anionic group at a side chain thereof, and an aqueous medium; and
a treatment liquid including an acidic compound that aggregates one or more components of the aqueous ink composition.

<2> The ink set of <1>, wherein the graft polymer has an acid value of from 5 mgKOH/g to less than 500 mgKOH/g.

<3> The ink set of <1> or <2>, wherein the anionic group is a carboxy group.

<4> The ink set of any one of <1> to <3>, wherein the side chain includes a repeating unit including an anionic group.

<5> The ink set of any one of <1> to <4>, wherein at least a potion of surfaces of particles of the pigment is coated with the graft polymer.

<6> The ink set of any one of <1> to <5>, wherein the main chain of the graft polymer includes a repeating unit represented by the following formula (1):

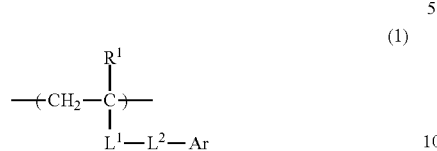

wherein in formula (1), $R^1$ represents a hydrogen atom or a methyl group; $L^1$ represents —COO—, OCO—, —CONR$^2$—, or a substituted or unsubstituted phenylene group; $R^2$ represents a hydrogen atom or an alkyl group having from 1 to 6 carbon atoms; $L^2$ represents a single bond, a divalent linking group selected from the group consisting of alkylene groups each having from 1 to 12 carbon atoms, alkenylene groups each having from 2 to 12 carbon atoms, alkyl ether groups each having from 2 to 12 carbon atoms, —CO—, —NR—, —O—, —S—, —SO—, and —SO$_2$—, or a divalent group linking group formed from a combination of two or more linking groups selected from the group consisting of alkylene groups each having from 1 to 12 carbon atoms, alkenylene groups each having from 2 to 12 carbon atoms, alkyl ether groups each having from 2 to 12 carbon atoms, —CO—, —NR—, —O—, —S—, —SO—, and —SO$_2$—; $R^3$ represents a hydrogen atom or an alkyl group having from 1 to 6 carbon atoms; and Ar represents a group including an aromatic ring.

<7> The ink set of <6>, wherein in formula (1), Ar is a group derived from benzene, a condensed ring aromatic compound having 8 or more carbon atoms, a heterocyclic compound condensed with at least one aromatic ring, or a compound containing two or more benzene rings linked to each other.

<8> The ink set of claim any one of <1> to <7>, wherein the aqueous ink composition includes an aqueous UV curable material.

<9> An image forming method using the ink set of any one of <1> to <8>, comprising:
supplying the treatment liquid included in the ink set onto a recording medium; and
supplying the aqueous ink composition included in the ink set onto the recording medium,
wherein the aqueous ink composition and the treatment liquid are brought into contact with each other to form an image.

<10> The image forming method of <9>, further comprising heating and fixing.

<11> The image forming method of <9> or <10>, further comprising curing and fixing.

<12> The image forming method of any one of <9> to 11>, wherein the treatment liquid is supplied onto the recording medium before the aqueous ink composition is supplied onto the recording medium.

All publications, patent applications, and technical standards mentioned in this specification were herein incorporated by reference to the same extent as if each individual publication, patent application, or technical standard was specifically and individually indicated to be incorporated by reference.

What is claimed is:

1. An ink set comprising:
an aqueous ink composition including a pigment, a graft polymer including at a side chain thereof a repeating unit including an anionic group, and an aqueous medium; and
a treatment liquid including an acidic compound that aggregates one or more components of the aqueous ink composition.

2. The ink set of claim 1, wherein the graft polymer has an acid value of from 5 mgKOH/g to less than 500 mgKOH/g.

3. The ink set of claim 1, wherein the anionic group is a carboxy group.

4. The ink set of claim 1, wherein at least a portion of surfaces of particles of the pigment is coated with the graft polymer.

5. The ink set of claim 1, wherein the main chain of the graft polymer includes a repeating unit represented by the following formula (1):

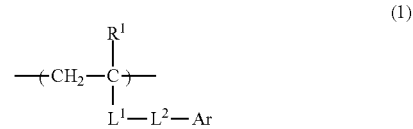

wherein, in formula (1), $R^1$ represents a hydrogen atom or a methyl group; $L^1$ represents —COO—, OCO—, —CONR$^2$—, or a substituted or unsubstituted phenylene group; $R^2$ represents a hydrogen atom or an alkyl group having from 1 to 6 carbon atoms; $L^2$ represents a single bond, a divalent linking group selected from the group consisting of alkylene groups each having from 1 to 12 carbon atoms, alkenylene groups each having from 2 to 12 carbon atoms, alkyl ether groups each having from 2 to 12 carbon atoms, —CO—, —NR$^3$—, —O—, —S—, —SO—, and —SO$_2$—, or a divalent group linking group formed from a combination of two or more linking groups selected from the group consisting of alkylene groups each having from 1 to 12 carbon atoms, alkenylene groups each having from 2 to 12 carbon atoms, alkyl ether groups each having from 2 to 12 carbon atoms, —CO—, —NR$^3$—, —O—, —S—, —SO—, and —SO$_2$—; $R^3$ represents a hydrogen atom or an alkyl group having from 1 to 6 carbon atoms; and Ar represents a group including an aromatic ring.

6. The ink set of claim 5, wherein in formula (1), Ar is a group derived from benzene, a condensed ring aromatic compound having 8 or more carbon atoms, a heterocyclic compound condensed with at least one aromatic ring, or a compound containing two or more benzene rings that are linked to each other.

7. The ink set of claim 1, wherein the aqueous ink composition includes an aqueous UV curable material.

8. An image forming method using the ink set of claim 1, comprising:
supplying the treatment liquid included in the ink set onto a recording medium; and
supplying the aqueous ink composition included in the ink set onto the recording medium,
wherein the aqueous ink composition and the treatment liquid are brought into contact with each other to form an image.

9. The image forming method of claim 8, further comprising heating and fixing.

10. The image forming method of claim 8, further comprising curing and fixing.

11. The image forming method of claim 8, wherein the treatment liquid is supplied onto the recording medium before the aqueous ink composition is supplied onto the recording medium.

12. The ink set of claim 1, wherein the pH (at 25° C.) of the aqueous ink composition is 7.5 or higher and the pH (at 25° C.) of the treatment liquid is 4 or lower.

* * * * *